US012539617B2

United States Patent
Hasegawa et al.

(10) Patent No.: US 12,539,617 B2
(45) Date of Patent: Feb. 3, 2026

(54) ROBOT, ROBOT CONTROL METHOD AND RECORDING MEDIUM

(71) Applicant: CASIO COMPUTER CO., LTD., Tokyo (JP)

(72) Inventors: Hirokazu Hasegawa, Koganei (JP); Miyuki Urano, Akiruno (JP); Erina Ichikawa, Sagamihara (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 196 days.

(21) Appl. No.: 18/242,527

(22) Filed: Sep. 6, 2023

(65) Prior Publication Data

US 2024/0100708 A1    Mar. 28, 2024

(30) Foreign Application Priority Data

Sep. 26, 2022   (JP) ................................. 2022-152956

(51) Int. Cl.
*G06F 17/00*    (2019.01)
*B25J 11/00*    (2006.01)
*B25J 19/00*    (2006.01)

(52) U.S. Cl.
CPC .......... *B25J 11/001* (2013.01); *B25J 19/005* (2013.01)

(58) Field of Classification Search
CPC ............................... B25J 11/001; B25J 19/005
USPC ......................................................... 700/245
See application file for complete search history.

(56) References Cited

U.S. PATENT DOCUMENTS

| 6,697,711 | B2 | 2/2004 | Yokono et al. |
| 11,579,617 | B2 | 2/2023 | Hayashi |
| 12,214,484 | B2 * | 2/2025 | Hasegawa .............. B25J 11/001 |
| 12,257,705 | B2 * | 3/2025 | Hasegawa .............. B25J 13/088 |
| 2019/0126157 | A1 | 5/2019 | Hayashi |
| 2019/0138019 | A1 | 5/2019 | Hayashi |
| 2019/0181666 | A1 | 6/2019 | Hayashi |
| 2021/0129035 | A1 | 5/2021 | Atsumi et al. |
| 2022/0297018 | A1 * | 9/2022 | Hasegawa ............. A63H 13/005 |
| 2022/0297307 | A1 * | 9/2022 | Hasegawa ............. G06N 3/008 |
| 2022/0299999 | A1 * | 9/2022 | Hasegawa ............. A63H 13/005 |

(Continued)

FOREIGN PATENT DOCUMENTS

| JP | S60168889 U | 11/1985 |
| JP | 2002239960 A | 8/2002 |

(Continued)

OTHER PUBLICATIONS

Bonding with Robotic Pets (Year: 2017).*

(Continued)

*Primary Examiner* — Ronnie M Mancho
(74) *Attorney, Agent, or Firm* — Holtz, Holtz & Volek PC

(57) ABSTRACT

A robot imitating a living thing and driven by a battery that is rechargeable, includes: an operator to perform an operation simulating a living thing; and a controller. The controller performs processing of causing the robot to perform a breathing operation that is an operation simulating breathing of a living thing at a predetermined cycle and processing of differentiating a control content of the operator between a charging breathing operation that is the breathing operation during charging of the battery and a non-charging breathing operation that is the breathing operation during non-charging of the battery.

13 Claims, 11 Drawing Sheets

(56) References Cited

U.S. PATENT DOCUMENTS

| | | | |
|---|---|---|---|
| 2023/0100762 A1* | 3/2023 | Hasegawa | B25J 13/081 |
| | | | 700/245 |
| 2023/0168682 A1 | 6/2023 | Hayashi | |
| 2025/0144809 A1* | 5/2025 | Hasegawa | B25J 9/162 |

FOREIGN PATENT DOCUMENTS

| | | | |
|---|---|---|---|
| JP | 2003071772 A | 3/2003 | |
| JP | 2003186539 A | 7/2003 | |
| JP | 2019063543 A | 4/2019 | |
| JP | 2019107461 A | 7/2019 | |
| JP | 2019123074 A | 7/2019 | |
| JP | 2021069771 A | 5/2021 | |

OTHER PUBLICATIONS

Japanese Office Action (and an English language translation thereof) dated Oct. 29, 2024, issued in Japanese Application No. 2022-152954 (which is a counterpart of related U.S. Appl. No. 18/227,400).

U.S. Appl. No. 18/227,400; First Named Inventor: Hirokazu Hasegawa; Title: "Robot, Robot Control Method and Recording Medium"; filed Jul. 28, 2023.

U.S. Appl. No. 18/242,532; First Named Inventor: Hirokazu Hasegawa; Title: "Robot, Robot Control Method and Recording Medium"; filed Sep. 6, 2023.

* cited by examiner

FIG. 6

| CONTROL CONDITION | CONTROL DATA |
|---|---|
| BODY IS PETTED | MOTION DATA<br>0:0:0<br>500:60:0<br>1000:60:60<br>1500:60:–60<br>2000:60:60<br>2500:60:–60<br><br>SOUND EFFECT DATA<br>HAPPY SOUND |
| HEARD A LOUD SOUND | MOTION DATA<br>0:0:0<br>100:60:0 |
| SPOKEN TO | SOUND EFFECT DATA<br>CHEERFUL SOUND |
| ⋮ | ⋮ |

124

ROBOT, ROBOT CONTROL METHOD AND RECORDING MEDIUM

CROSS-REFERENCE TO RELATED APPLICATIONS

This application claims priority based on Japanese Patent Application No. 2022-152956, filed on Sep. 26, 2022, the entire disclosure of which is incorporated by reference herein.

FIELD OF THE INVENTION

The present disclosure relates to a robot, a robot control method, and a recording medium.

BACKGROUND OF THE INVENTION

Techniques have been developed to provide robots with a sense of a living thing in such a way that the robots can imitate something users feel affection for, such as friends and pets. For example, Patent Literature 1 (Unexamined Japanese Patent Application Publication No. 2019-123074) discloses a technique for expressing a sense of a living thing by performing a "rendering during charging" such as causing a robot to act as if sleeping while charging, and performing a "rendering after charging" such as outputting theme music when charging is completed to produce a condition in which the robot recovers energy.

SUMMARY OF THE INVENTION

An aspect of a robot according to the present disclosure is a robot that imitates a living thing and is driven by a battery that is rechargeable, the robot including:
an operator to cause the robot to perform an operation that imitates a living thing; and
a controller, wherein
the controller:
causes the robot to perform a breathing operation that is an operation imitating breathing of a living thing at a predetermined cycle; and
differentiates a control content of the operator between a charging breathing operation that is the breathing operation during charging of the battery and a non-charging breathing operation that is the breathing operation during non-charging of the battery.

BRIEF DESCRIPTION OF DRAWINGS

A more complete understanding of this application can be obtained when the following detailed description is considered in conjunction with the following drawings, in which:
FIG. 6 is a diagram illustrating an example of a control content table according to Embodiment 1.

DETAILED DESCRIPTION OF THE INVENTION

Figure 1:
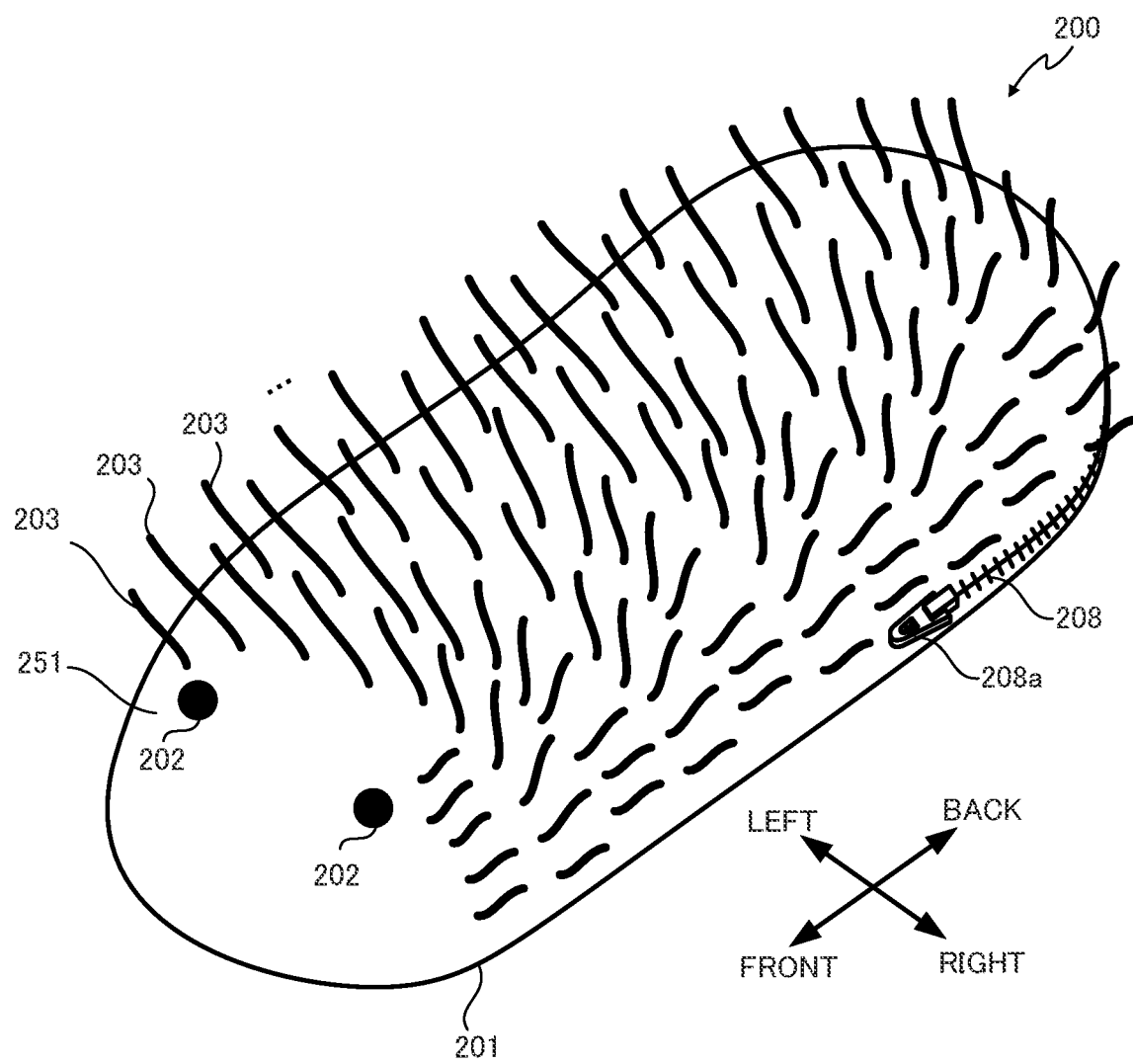
FIG. 1 is a perspective view illustrating the appearance of a robot according to Embodiment 1.

The following describes embodiments of the present disclosure with reference to the drawings. Note that the same or equivalent components of the drawings are denoted by the same reference numerals.

Embodiment 1

Figure 2:
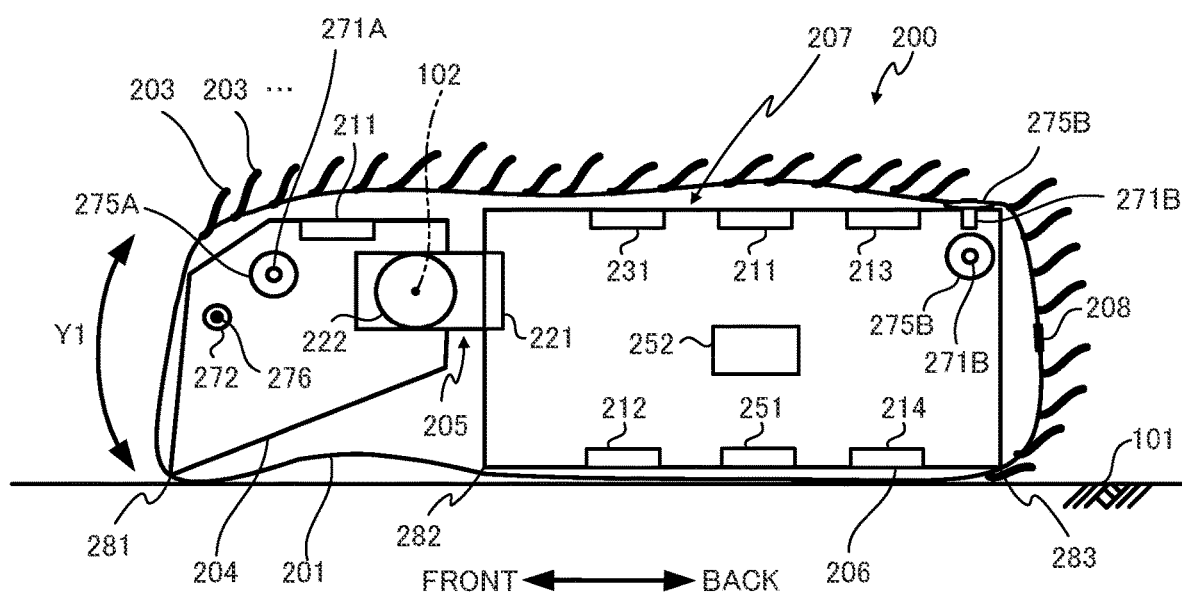
FIG. 2 is a cross-sectional view orthogonal to the left-and-right direction of the robot according to Embodiment 1.
Figure 3:
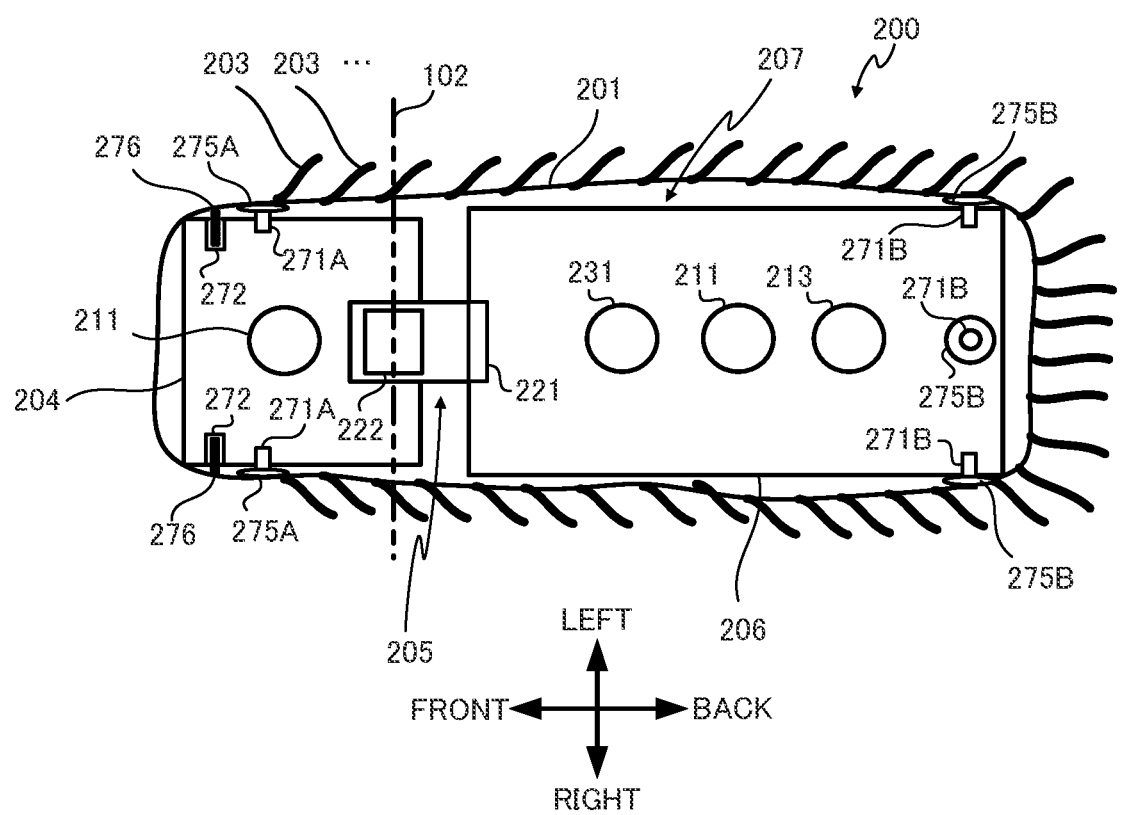
FIG. 3 is a cross-sectional view orthogonal to the up-and-down direction of the robot according to Embodiment 1.

The robot 200 according to Embodiment 1 is a pet robot that imitates a small animal as illustrated in FIG. 1. In order to facilitate understanding, FIG. 1 denotes the directions of front, back, left, and right. The following description proceeds with reference to these directions as necessary. The robot 200 is provided with two eye-like decorative members 202 on the front side. Also, as illustrated in FIGS. 2 and 3, the robot 200 includes a housing 207 and an exterior 201 having flexibility to cover the housing 207. The exterior 201 has a large number of fuzzy hairs 203 that imitate fur. Note that, in FIGS. 2 and 3, hatching patterns are omitted in view of facilitating visibility of the drawings.

As illustrated in FIGS. 2 and 3, the housing 207 of the robot 200 includes a head 204, a joint 205, and a body 206 where the joint 205 couples the back end of the head 204 and the front end (front side) of the body 206. The body 206 extends in the front-and-back direction, as illustrated in FIG. 2. The body 206 is in contact, via the exterior 201, with a mounting surface, such as a floor or a table, on which the robot 200 is placed. Also, as illustrated in FIG. 2, a twist motor 221 is provided at the front end of the body 206, and the head 204 is coupled to the front end of the body 206 via the joint 205. The joint 205 is provided with an up-and-down motor 222. Although the twist motor 221 is provided in the body 206 in FIG. 2, the twist motor 221 may be provided in the joint 205 or may be provided in the head 204.

The joint 205 couples the body 206 and the head 204 so that the body 206 and the head 204 freely rotate (by the twist motor 221) about a first rotational axis extending forth and back along the body 206 through the joint 205. The twist motor 221 can rotate the head 204 clockwise or counterclockwise about the first rotational axis relative to the body 206. Note that the clockwise direction herein is the clockwise direction when viewed from the head 204 toward the direction of the body 206. The clockwise rotation is also referred to as the "rightward twist" and the counterclockwise rotation as the "leftward twist." The maximum value of the angle at which the head 204 is twisted rightward (right turn) or leftward (left turn) by the twist motor 221 is arbitrary. However, the angle of the head 204 in a state in which the head 204 is not twisted rightward or leftward is referred to as a twist reference angle, and the left-and-right rotation angle of the head 204 at this time is 0 degrees. The value of the left-and-right rotation angle of the head 204 when the head 204 is rotated rightward from the twist reference angle is positive, and the value of the left-and-right rotation angle of the head 204 when the head 204 is rotated leftward from the twist reference angle is negative.

The joint 205 also couples the body 206 and the head 204 so that the body 206 and the head 204 can rotate freely (by the up-and-down motor 222) about a second rotational axis extending in the width direction (left-and-right direction) of the body 206 through the joint 205. The up-and-down motor 222 can rotate the head 204 up and down about the second rotational axis as indicated by arrow Y1. The maximum value of the rotation angle upward or downward is arbitrary. However, the angle of the head 204 in a state in which the head 204 is not rotated upward or downward is referred to as an up-and-down reference angle, and the up-and-down rotation angle of the head 204 at this time is 0 degrees. The value of the up-and-down rotation angle of the head 204 when the head 204 is rotated upward from the up-and-down reference angle is positive, and the value of the up-and-down rotation angle of the head 204 when the head 204 is rotated downward from the up-and-down reference angle is negative.

When the head 204 is rotated to or below the up-and-down reference angle due to up-and-down rotation about the second rotational axis (when the up-and-down rotation angle of the head 204 is 0 or negative degrees), the front lower portion 281 of the head 204 can contact a mounting surface, such as a floor or a table, on which the robot 200 is placed via the exterior 201. Although FIG. 2 illustrates an example in which the first rotational axis and the second rotational axis are orthogonal to each other, the first and second rotational axes may not be orthogonal to each other.

In addition, the body 206 constituting a part of the housing 207 has a shape like a cuboid elongated in the front-and-back direction. When the up-and-down rotation angle of the head 204 is 0 or larger degrees, as illustrated in FIG. 2, the body 206 is loaded on the mounting surface 101, such as a floor or table, with the body 206 from the front lower portion 282 to the back lower portion 283 in contact with the mounting surface 101 via the exterior 201. Thus, in a state in which the body 206 is placed on the mounting surface 101, the head 204 is connected to the front end of the body 206 to be able to rotate (upward than the up-and-down reference angle) in a direction in which a distance between the front lower portion 282 of the head 204 and the mounting surface 101 changes centering on the connection position between the head 204 and the body 206 (the second rotational axis of the joint 205).

In addition, when the head 204 is rotated downward than the up-and-down reference angle from the state illustrated in FIG. 2, the front lower portion 281 of the head 204 and the back lower portion 283 of the body 206 come into contact with the mounting surface via the exterior 201, allowing the front lower portion 282 of the body 206 to be raised relative to the mounting surface. The distance by which the front lower portion 282 of the body 206 is raised from the mounting surface can change in accordance with the downward rotation angle of the head 204.

The head 204 constituting a part of the housing 207 is a site corresponding to the head of the robot 200 imitating a small animal. As illustrated in FIGS. 2 and 3, the left and right sides of the head 204 are each fitted with a protrusion member 271A as a first engaged portion to be engaged with a first engaging portion (engagement plate 275A) provided in the exterior 201. That is, the first engaged portion is located on the front side of the connection position (the second rotational axis of the joint 205). In addition, the exterior 201 is provided with exterior protrusions (protrusion members 276) within a specific range from the engagement plates 275A (for example, within 2 cm from the engagement plates 275A), and the head 204 is provided with head recesses (recesses 272) within a specific range from the protrusion members 271A (for example, within 2 cm from the protrusion members 271A).

As illustrated in FIGS. 2 and 3, the left and right sides and the upper surface of the body 206 are each provided with a protrusion member 271B as a second engaged portion similar to those provided in the head 204. Similar to the first engaged portions, the protrusion members 271B as the second engaged portions engage with second engaging portions (the engagement plates 275B) provided in the exterior 201. Hereinafter, the first engaging portion (the engagement plate 275A) and the second engaging portion (the engagement plate 275B) are collectively referred to simply as the engaging portion (the engagement plate 275). Also, the first engaged portion (the protrusion member 271A) and the second engaged portion (the protrusion member 271B) are collectively referred to as the engaged portion (the protrusion member 271).

As illustrated in FIGS. 1 and 2, the exterior 201 has a bag shape that is long in the front-and-back direction and has elasticity that can accommodate the housing 207 therein. The surface of the exterior 201 has a large number of hairs 203 that imitate fur of a small animal, as illustrated in FIGS. 1 to 3, which can be made of, for example, pile fabrics. This allows the texture of the robot 200 to resemble that of a small animal.

A slide fastener 208 is attached to the back of the exterior 201, as illustrated in FIG. 1. By sliding the slider 208a of the slide fastener 208 to close the slide fastener 208 while the exterior 201 receiving the housing 207 inside, the state in which the housing 207 (FIG. 2) is received in the exterior 201 is maintained. On the other hand, by sliding the slider 208a to open the slide fastener 208, the housing 207 can be brought in and out of the exterior 201.

When receiving the housing 207 in the exterior 201, the engaging portion (the engagement plate 275) of the exterior 201 is engaged with the engaged portion (the protrusion member 271), and the exterior protrusion (the protrusion member 276) is inserted into the head recess (the recess 272). By engaging the engaging portion (the engagement plate 275) of the exterior 201 with the engaged portion (the protrusion member 271), the exterior 201 is secured to the housing 207 and follows the movement of the housing 207. As a result, the upper side of the exterior 201 is pulled or slacked in accordance with the movement of the housing 207. In addition, by inserting the exterior protrusion (the protrusion member 276) into the head recess (the recess 272), the position of the exterior protrusion of the exterior 201 is secured to the position of the head recess of the housing 207, improving the accuracy of the exterior 201 following the movement of the housing 207.

The exterior 201 then moves following the housing 207 in accordance with an operation of the housing 207 caused by driving the twist motor 221 and the up-and-down motor 222. When the exterior 201 moves following the housing 207, the upper side of the exterior 201 is pulled or slacked, which movement is like a movement imitating the movement of a small animal. Thus, by controlling the movable portion 220, the controller 110 can cause the robot 200 that imitates a small animal to operate as if it were alive.

Conventionally, a large number of engagement plates 275 and protrusion members 271 (for example, 9 pieces each) have been required to be provided in order to cause the exterior 201 to accurately follow the movement of the housing 207. However, in the present embodiment, the protrusion members 271A of the head 204 can be suppressed to one on the left and one on the right (a total of two), and the protrusion members 271B of the body 206 can be suppressed to one on the left, one on the right, and one on the upper surface (a total of three). Even though the number of components is reduced in this way, the housing 207 includes protrusion members 271 and the exterior 201 includes engagement plates 275, respectively, at appropriate positions so that the exterior 201 is easy to be pulled or slackened during a breathing operation as described later. Then, with head recesses and exterior protrusions provided, the accuracy of the exterior 201 following the movement of the housing 207 is further improved. In addition, due to the reduction in the number of components, the assembly man-hours are reduced, and the installation of the exterior 201 is simplified, thereby realizing cost reductions. Furthermore, the exterior 201 can be attached and detached more easily by a user.

The robot 200 may also include a touch sensor 211 in the head 204 in order to detect that a user has petted or struck the head 204 by the touch sensor 211, as illustrated in FIG. 2. The robot 200 also includes a touch sensor 211 in the body 206 in order to detect that a user has petted or struck the body 206 by the touch sensor 211.

The robot 200 also includes an acceleration sensor 212 in the body 206 in order to detect a posture (orientation) of the robot 200 or to detect that the robot 200 has been lifted, turned, or thrown by a user. The robot 200 also includes a gyro sensor 214 in the body 206 in order to detect that the robot 200 is rolling or rotating.

The robot 200 also includes a microphone 213 in the body 206 in order to detect an external sound. In addition, the robot 200 includes a speaker 231 in the body 206 in order to emit a sound (a sound effect) of the robot 200 using the speaker 231.

The robot 200 also includes a power receiver 251 on the bottom surface of the body 206. The robot 200 is driven by a rechargeable battery 252 provided inside the housing 207 and receives power transmitted from the wireless charger by the power receiver 251 to charge the battery 252. The wireless charger imitates a pet cage (house) and includes a seat-type power supply mounting surface. When the robot 200 is loaded on the power supply mounting surface of the wireless charger, the battery 252 is started to be charged.

Although the acceleration sensor 212, the gyro sensor 214, the microphone 213, and the speaker 231 are provided in the body 206 in the present embodiment, all or some of these may instead be provided in the head 204. Alternatively, in addition to the acceleration sensor 212, gyro sensor 214, microphone 213, and speaker 231 provided in the body 206, all or some of these may also be provided in the head 204. Although the touch sensors 211 are provided both in the head 204 and in the body 206, the touch sensor 211 may be provided only in either the head 204 or the body 206. Alternatively, a plurality of touch sensors 211 may be provided in one or both of the head 204 and the body 206.

Also, in the present embodiment, since the housing 207 is covered by the exterior 201, the head 204 and the body 206 are indirectly in contact, via the exterior 201, with the mounting surface, such as a floor or a table, on which the robot 200 is placed. However, without being limited to such a mode, the head 204 and the body 206 may be directly in contact with the mounting surface. For example, the lower portion of the housing 207 (a portion in contact with the mounting surface, for example, the bottom surface of the body 206) may be exposed without the presence of the lower portion of the exterior 201 (the portion in contact with the mounting surface), or the entire housing 207 may be exposed without the presence of the exterior 201 at all.

Figure 4:
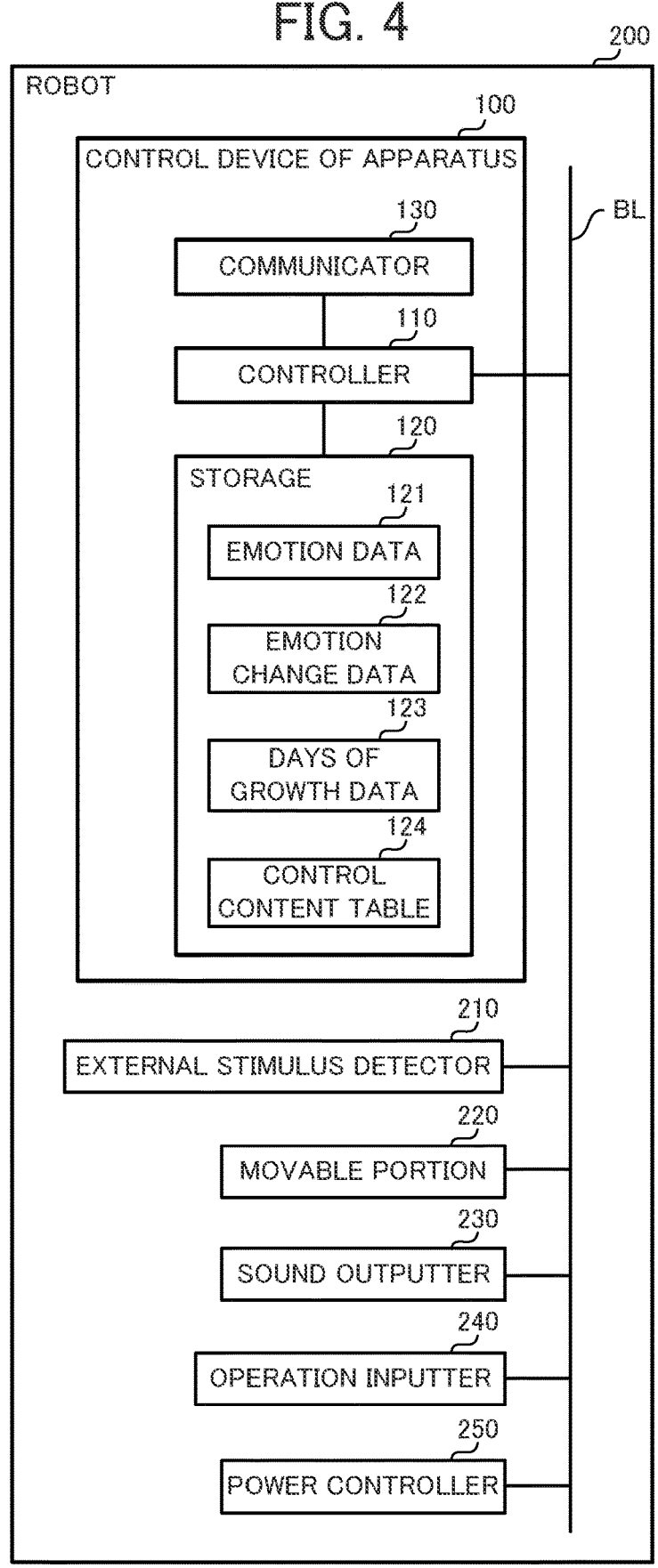
FIG. 4 is a block diagram illustrating the functional configuration of the robot according to Embodiment 1.

Next, the functional configuration of the robot 200 is described. The robot 200 includes, as illustrated in FIG. 4, a control device 100 of an apparatus, an external stimulus detector 210, a movable portion 220, a sound outputter 230, an operation inputter 240, and a power controller 250. The control device 100 of the apparatus includes a controller 110, a storage 120, and a communicator 130. In FIG. 4, the control device 100 of the apparatus is connected to the external stimulus detector 210, the movable portion 220, the sound outputter 230, the operation inputter 240, and the power controller 250 via a bus line BL, as an example. The control device 100 of the apparatus may be connected to the external stimulus detector 210, the movable portion 220, the sound outputter 230, the operation inputter 240, and the power controller 250 via a wired interface such as a universal serial bus (USB) cable or a wireless interface such as Bluetooth (registered trademark), or the like. In addition, the controller 110 may be connected to the storage 120 and the communicator 130 via a bus line BL or the like.

The control device 100 of the apparatus controls the operation of the robot 200 (a movement caused by the movable portion 220, a sound output from the sound outputter 230, and/or the like) by the controller 110 and the storage 120.

The controller 110 includes, for example, a central processing unit (CPU) or the like and executes various processing (robot control processing, and the like) as described later by a program stored in the storage 120. Note that the controller 110 is compatible with a multithreading function that executes a plurality of processes in parallel, and thus various types of processing (robot control processing, breathing imitation processing, end-of-charge operation processing, and the like) as described later can be executed in parallel. In addition, the controller 110 includes a clock function and a timer function and can time a date and time, and/or the like.

The storage 120 includes a read-only memory (ROM), a flash memory, a random access memory (RAM), and/or the like. The ROM stores a program to be executed by the CPU of the controller 110 and other data that are a prerequisite for executing the program. The flash memory is a rewritable, non-volatile memory that stores the data that should be retained even after the power is turned off. The RAM stores data that are created or modified during program execution.

The communicator 130 includes a communication module compatible with a wireless local area network (LAN), Bluetooth (registered trademark), and/or the like, and communicates data with an external device such as a smartphone. The details of the data communication include, for example, receiving a remaining battery level notification request and transmitting information on the remaining battery level for displaying the remaining battery level of the robot 200 on a smartphone or the like.

The external stimulus detector 210 includes the aforementioned touch sensor 211, acceleration sensor 212, gyro sensor 214, and microphone 213. The controller 110 acquires detected values detected by various sensors equipped in the external stimulus detector 210 as external stimulus data representing an external stimulus acting on the robot 200. Note that the external stimulus detector 210 may also include other sensors than the touch sensor 211, the acceleration sensor 212, the gyro sensor 214, and the microphone 213. By increasing the types of sensors equipped in the external stimulus detector 210, the types of external stimuli acquirable by the controller 110 can be increased. Conversely, the external stimulus detector 210 need not necessarily comprise all of the sensors described above. For example, if angular velocity detection is not required, the external stimulus detector 210 may not comprise a gyro sensor 214.

The touch sensor 211 detects that a certain object has come into contact. The touch sensor 211 includes, for example, a pressure sensor, a capacitance sensor, or the like. The controller 110 can detect that a user has petted, struck, or the like the robot 200 based on a detected value from the touch sensor 211.

The acceleration sensor 212 detects acceleration in three axis directions consisting of a front-and-back direction (X-axis direction), a width (left-and-right) direction (Y-axis direction), and an up-and-down direction (Z-axis direction) of the body 206 of the robot 200. Since the acceleration sensor 212 detects gravitational acceleration when the robot 200 is stationary, the controller 110 can detect the current posture of the robot 200 based on the gravitational acceleration detected by the acceleration sensor 212. Also, for example, when a user lifts or throws the robot 200, the acceleration sensor 212 detects the acceleration associated with the movement of the robot 200 in addition to the gravitational acceleration. Accordingly, the controller 110 can detect the movement of the robot 200 by subtracting the gravitational acceleration component from the detected value detected by the acceleration sensor 212.

The gyro sensor 214 detects an angular velocity when rotation is applied to the body 206 of the robot 200. Specifically, the gyro sensor 214 detects an angular velocity of the three axis rotations consisting of a rotation about the front-and-back direction axis (X-axis direction), a rotation about the width (left-and-right) direction axis (Y-axis direction), and a rotation about the up-and-down direction axis (Z-axis direction) of the body 206. The controller 110 can more accurately detect the movement of the robot 200 by combining the detected value detected by the acceleration sensor 212 with the detected value detected by the gyro sensor 214.

Note that the touch sensor 211, the acceleration sensor 212, and the gyro sensor 214 are synchronized, respectively detect the intensity, acceleration, and angular velocity of a contact at the same timing, and output the detected values to the controller 110. Specifically, the touch sensor 211, the acceleration sensor 212, and the gyro sensor 214 detect the intensity, acceleration, and angular velocity of a contact at the same timing, for example, every 0.25 seconds.

The microphone 213 detects sounds around the robot 200. The controller 110 can detect, for example, a user calling the robot 200 or clapping hands, based on the sound component detected by the microphone 213.

The movable portion 220 is for causing the robot 200 to perform an operation that imitates the movement of a living thing, and includes a twist motor 221 and an up-and-down motor 222. The movable portion 220 (the twist motor 221 and the up-and-down motor 222) is driven by the controller 110. The twist motor 221 and the up-and-down motor 222 are servo motors that, when instructed by the controller 110 with a specified operation time and operation angle, operate to rotate to the position of the specified operation angle by the specified operating time. As a result, the robot 200 can express operations, for example, raising the head 204 (rotating the head 204 upward about the second rotational axis) relative to the body 206 or twisting the head 204 sideways (rotating the head 204 rightward or leftward about the first rotational axis). Motion data for driving the movable portion 220 to express these operations are recorded in a control content table 124 as described later.

Note that when the twist motor 221 is rotated to a certain operation angle θ, the left-and-right rotation angle of the head 204 becomes θ. When the up-and-down motor 222 is rotated to a certain operation angle θ, the up-and-down rotation angle of the head 204 becomes θ.

The sound outputter 230 includes a speaker 231 that outputs a sound when the controller 110 inputs sound data into the sound outputter 230. The sound output by the sound outputter 230 is not limited to a voice, and an arbitrary sound can be output. For example, when the controller 110 inputs sound data of the robot 200 to the sound outputter 230, the robot 200 emits a simulated sound (for example, a sound that imitates the sound of a living thing). The sound data are also stored in the control content table 124 as sound effect data.

Note that both the movable portion 220 and the sound outputter 230 are functional units for performing operations that imitate a living thing (including not only operations of physical movements, but also operations that emit a sound, or the like), and thus are collectively referred to as an "operator." The robot 200 may also be provided with additional functional units other than these in order to perform operations that imitate a living thing, in which case the added functional units are also referred to as the operator.

The operation inputter 240 includes, for example, an operation button and a volume knob. The operation inputter 240 is an interface for accepting an operation by a user, for example, power on/off and volume adjustment of an output sound.

The power controller 250 includes a sub microcomputer, a charging integrated circuit (IC), a power control IC, a power receiver 251, and/or the like, and charges the battery 252 of the robot 200, acquires the remaining level of the battery 252, and controls the power supply of the robot 200.

The battery 252 of the robot 200 is charged by wireless charging without being connected to a charging cable or the like in order to express the sense of a living thing. Although the wireless charging method is arbitrary, the present embodiment uses an electromagnetic induction method. When the robot 200 is mounted on the power supply mounting surface of the wireless charger, an induced magnetic flux is generated between the receiving antenna of the power receiver 251 provided on the bottom surface of the body 206 and the transmitting antenna of the external wireless charger, the wireless charger performs a power supply operation for charging the battery 252, then, the battery 252 is charged.

Next, emotion data 121, emotion change data 122, days of growth data 123, and a control content table 124 are described sequentially among data stored in the storage 120 of the control device 100 of the apparatus.

Figure 5:
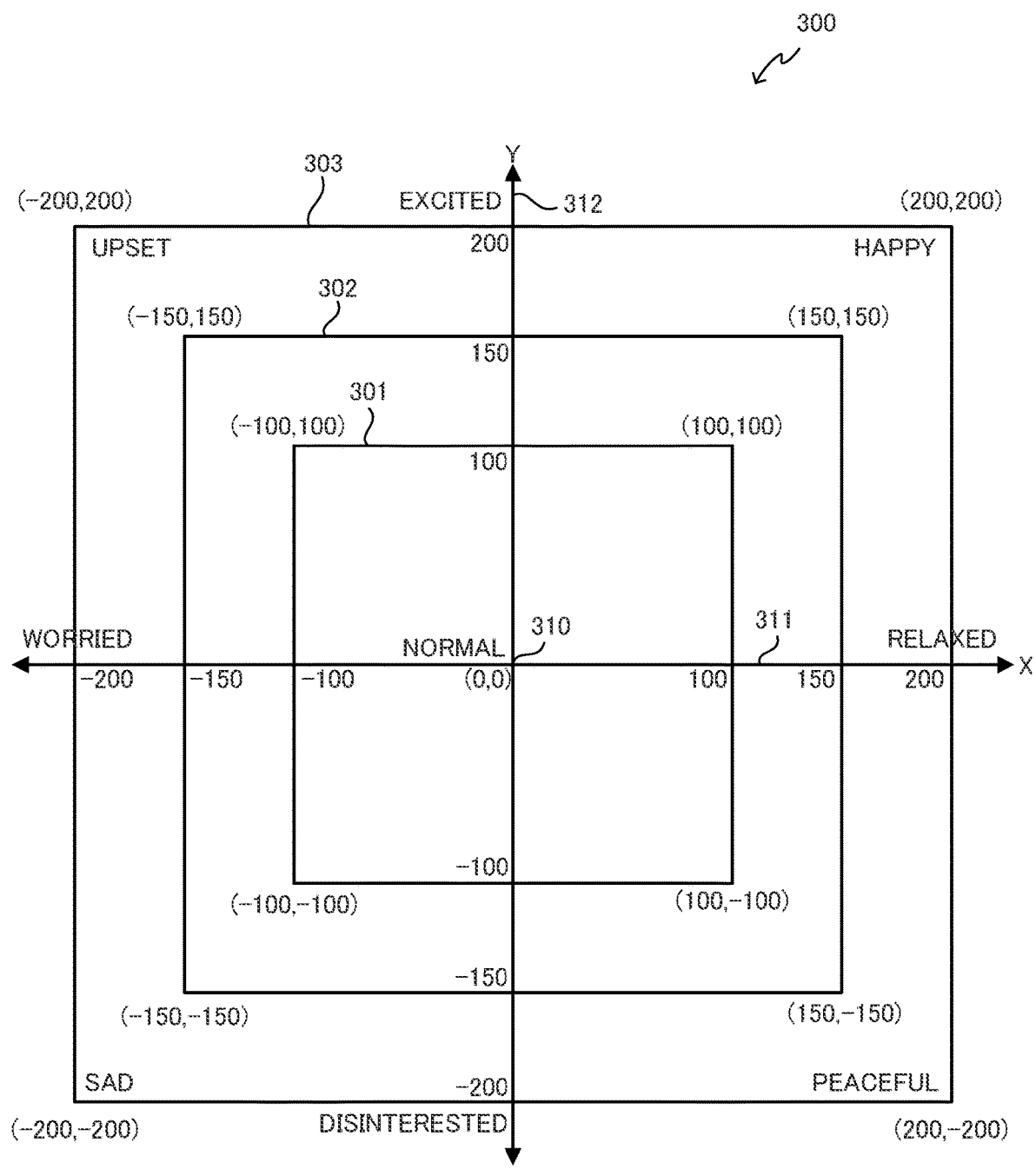
FIG. 5 is a diagram illustrating an example of an emotion map according to Embodiment 1.

The emotion data 121 are data for causing the robot 200 to show a simulated emotion, and are data indicating coordinates (X, Y) in the emotion map 300. As illustrated in FIG. 5, the emotion map 300 is expressed in a two-dimensional coordinate system having a degree of relaxation (degree of worry) axis as the X axis 311 and a degree of excitement (degree of disinterest) axis as the Y axis 312. The origin 310 (0, 0) in the emotion map represents an emotion of normal time. Moreover, as the value of the X coordinate (X value) is positive and the absolute value thereof increases, emotions for which the degree of relaxation is high are expressed and, as the value of the Y coordinate (Y value) is positive and the absolute value thereof increases, emotions for which the degree of excitement is high are expressed. Additionally, as the X value is negative and the absolute value thereof increases, emotions for which the degree of worry is high are expressed and, as the Y value is negative and the absolute value thereof increases, emotions for which the degree of disinterest is high are expressed.

The emotion data 121 have two values, an X value (degree of relaxation, degree of worry) and a Y value (degree of excitement, degree of disinterest), representing a plurality (four in the present embodiment) of simulated emotions that are different from each other, and a point in the emotion map 300 represented by the X value and the Y value represents a simulated emotion of the robot 200. The initial value of the emotion data 121 is (0, 0). Because the emotion data 121 are a parameter representing a simulated emotion of the robot 200, the emotion data 121 are also referred to as an emotion parameter. Although the emotion map 300 is expressed in a two-dimensional coordinate system in FIG. 5, the number of dimensions of the emotion map 300 is arbitrary. The emotion map 300 may be defined in one dimension so that one value is set as emotion data 121. Alternatively, other axes may be added to define the emotion map 300 in a coordinate system having three or more dimensions, and a value in the number of dimensions of the emotion map 300 may be set as emotion data 121.

In the present embodiment, the size of the emotion map 300 as initial values is a maximum value of 100 and a minimum value of −100 both in X and Y values, as illustrated in the frame 301 of FIG. 5. During a first period, the maximum and minimum values of the emotion map 300 increment by two each time the simulated days of growth of the robot 200 increases by one day. Here, the first period is a period in which the robot 200 simulatedly grows, and is a period of, for example, 50 days from the simulated birth of the robot 200. Note that the simulated birth of the robot 200 is an initial activation by a user after the robot 200 is shipped from the factory. When the days of growth reach 25 days, as indicated by the frame 302 of FIG. 5, the maximum values of X value and Y value become 150, and the minimum values become −150. Then, when the first period (in this example, 50 days) has passed, assuming that the simulated growth of the robot 200 has been completed, as indicated by the frame 303 of FIG. 5, the maximum values of X value and Y value become 200 and the minimum values become −200, and the size of the emotion map 300 is fixed.

The emotion change data 122 are data for setting a change amount that increases or decreases each of the X and Y values of the emotion data 121. In the present embodiment, there are a DXP that increases the X value and a DXM that decreases the X value as the emotion change data 122 for the X of the emotion data 121, and a DYP that increases the Y value and a DYM that decreases the Y value as the emotion change data 122 for the Y value of the emotion data 121. That is, the emotion change data 122 consists of the following four variables. Since these variables are parameters that change the simulated emotion of the robot 200, they are also called emotion change parameters.

DXP: tendency to be relaxed (tendency to change in the positive value direction of the X value on the emotion map),
DXM: tendency to be worried (tendency to change in the negative value direction of the X value on the emotion map),
DYP: tendency to be excited (tendency to change in the positive value direction of the Y value on the emotion map),
DYM: tendency to be disinterested (tendency to change in the negative value direction of the Y value on the emotion map)

In the present embodiment, as an example, the initial values of all of these variables are set to 10, and are increased to a maximum of 20 by the processing of learning emotion change data during robot control processing described later. Since this learning processing changes the emotion change data 122 (that is, the degree of emotional change), the robot 200 develops various characters depending on how a user interacts with the robot 200. In other words, the character of the robot 200 is formed differently depending on how a user interacts with the robot 200.

Accordingly, in the present embodiment, each character data (a character value) is derived by subtracting 10 from each emotion change data 122. In other words, the value subtracting 10 from a DXP indicating a tendency to be relaxed is taken as a character value (chirpy), the value subtracting 10 from a DXM indicating a tendency to be worried is taken as a character value (shy), the value subtracting 10 from a DYP indicating a tendency to be excited is taken as a character value (active), and the value subtracting 10 from a DYM indicating a tendency to be disinterested is taken as a character value (spoiled). Thus, the value of the emotion change parameter (the emotion change data 122) can be said to represent the simulated character of the robot 200.

The days of growth data 123 have an initial value of 1, and is added by 1 as each day passes. The days of growth data 123 represents the simulated days of growth (the number of days since the simulated birth) of the robot 200. Here, a period of the days of growth represented by the days of growth data 123 is referred to as a second period.

The control content table 124 stores control conditions and control data in association with each other, as illustrated in FIG. 6. When a control condition (for example, a certain external stimulus is detected) is satisfied, the controller 110 controls the movable portion 220 and the sound outputter 230 based on corresponding control data (motion data in order to express a movement by the movable portion 220 and sound effect data in order to output a sound effect by the sound outputter 230).

The motion data are a series of sequence data for controlling the movable portion 220 (in the order of time (milliseconds), a rotation angle (degrees) of the up-and-down motor 222, and a rotation angle (degrees) of the twist motor 221), as illustrated in FIG. 6. For example, when the body is petted, the controller 110 controls the movable portion 220 by setting the rotation angles of the up-and-down motor 222 and the twist motor 221 to 0 degrees (the up-and-down reference angle and twist reference angle) at first (0 seconds), raising the head 204 so that the rotation angle of the up-and-down motor 222 becomes 60 degrees in 0.5 seconds, and twisting the head 204 so that the rotation angle of the twist motor 221 becomes 60 degrees in 1 second.

Although, in FIG. 6, a text explaining each sound effect data is described to facilitate understanding, in fact, the sound effect data themselves (the sampled sound data) explained by these texts are stored in the control content table 124 as sound effect data.

Although the control content table illustrated in FIG. 6 does not include a condition related to an emotion (represented by coordinates in the emotion map 300) in the control conditions, the control data may be changed in accordance with an emotion by including a condition related to an emotion in the control conditions.

Next, robot control processing executed by the controller 110 of the control device 100 of the apparatus is described with reference to the flowchart illustrated in FIG. 7. The robot control processing is processing in which the control device 100 of the apparatus controls an operation and sound of the robot 200 based on a detected value or the like from the external stimulus detector 210. When a user turns on the robot 200, the robot control processing starts.

First, the controller 110 initializes various types of data such as emotion data 121, emotion change data 122, and days of growth data 123 (step S101). Note that, for the second activation of the robot 200 and after, each value that were set at the time the robot 200 last turned off may be set in step S101. This can be achieved by the controller 110 storing the value of each data in a non-volatile memory (a flash memory or the like) of the storage 120 when the last power-off operation is performed, and then setting the stored value to the value of each data when the power is turned on.

Next, the controller 110 acquires a detected value detected by the external stimulus detector 210 (step S102). The controller 110 then determines whether or not an external stimulus was present based on the acquired detected value (step S103).

When an external stimulus was present (step S103; Yes), the controller 110 acquires emotion change data 122 in accordance with the detected value of the external stimulus acquired in step S102 (step S104). Specifically, for example, when the touch sensor 211 of the head 204 detects that the head 204 has been petted as an external stimulus, the robot 200 acquires a simulated sense of relaxation, and thus the controller 110 acquires a DXP as the emotion change data 122 to be added to the X value of the emotion data 121.

The controller 110 then sets the emotion data 121 in accordance with the emotion change data 122 acquired in step S104 (step S105). Specifically, for example, when a DXP is acquired as the emotion change data 122 in step S104, the controller 110 adds the DXP of the emotion change data 122 to the X value of the emotion data 121.

What kind of emotion change data 122 is acquired for each external stimulus for setting the emotion data 121 in steps S104 and S105 is arbitrarily; the following illustrates an example.

The head 204 is petted (relax): X=X+DXP, the head 204 is struck (worry): X=X−DXM (these external stimuli can be detected by the touch sensor 211 of the head 204); the body 206 is petted (excite): Y=Y+DYP, the body 206 is struck (disinterest): Y=Y−DYM (these external stimuli can be detected by the touch sensor 211 of the body 206); Embraced with the head upward (happy): X=X+DXP and Y=Y+DYP, suspended with the head downward (sad): X=X−DXM and Y=Y−DYM (these external stimuli can be detected by the touch sensor 211, the acceleration sensor 212, and the gyro sensor 214); Spoken to in gentle voice (peaceful): X=X+DXP and Y=Y−DYM, yelled out in loud voice (upset): X=X−DXM and Y=Y+DYP (these external stimuli can be detected by the microphone 213)

However, when adding the emotion change data 122 causes the value (X value, Y value) of the emotion data 121 to exceed the maximum value of the emotion map 300, the value of the emotion data 121 is set to the maximum value of the emotion map 300. Also, when subtracting the emotion change data 122 causes the value of the emotion data 121 to be less than the minimum value of the emotion map 300, the value of the emotion data 121 is set to the minimum value of the emotion map 300.

Subsequently, the controller 110 refers to the control content table 124 and acquires control data associated with the control condition that is satisfied by the detected value of the acquired external stimulus (step S106).

The controller 110 then playbacks the control data acquired in step S106 (step S107) and proceeds to step S111.

On the other hand, in step S103, when there is no external stimulus (step S103; No), the controller 110 determines whether or not to perform a spontaneous operation (such as a breathing operation that is an operation that imitates the breathing of a living thing) (step S108). Although the method for determining whether or not to perform a spontaneous operation is arbitrary, in the present embodiment, the determination of step S108 is Yes and the breathing operation is performed at each breathing cycle (for example, 2 seconds).

If a spontaneous operation is not performed (step S108; No), the controller 110 proceeds to step S111. If a spontaneous operation is performed (step S108; Yes), the controller 110 performs a breathing imitation processing to perform a breathing operation that is an operation that imitates the breathing of a living thing, as a spontaneous operation (step S109), and proceeds to step S111. Note that the details of the breathing imitation processing are described later. Although, in the present embodiment, as a spontaneous operation, the operation instructed to be performed by the controller 110 is only the breathing operation, the robot 200 may perform other spontaneous operations instead of or in addition to the breathing operation.

Figure 7:
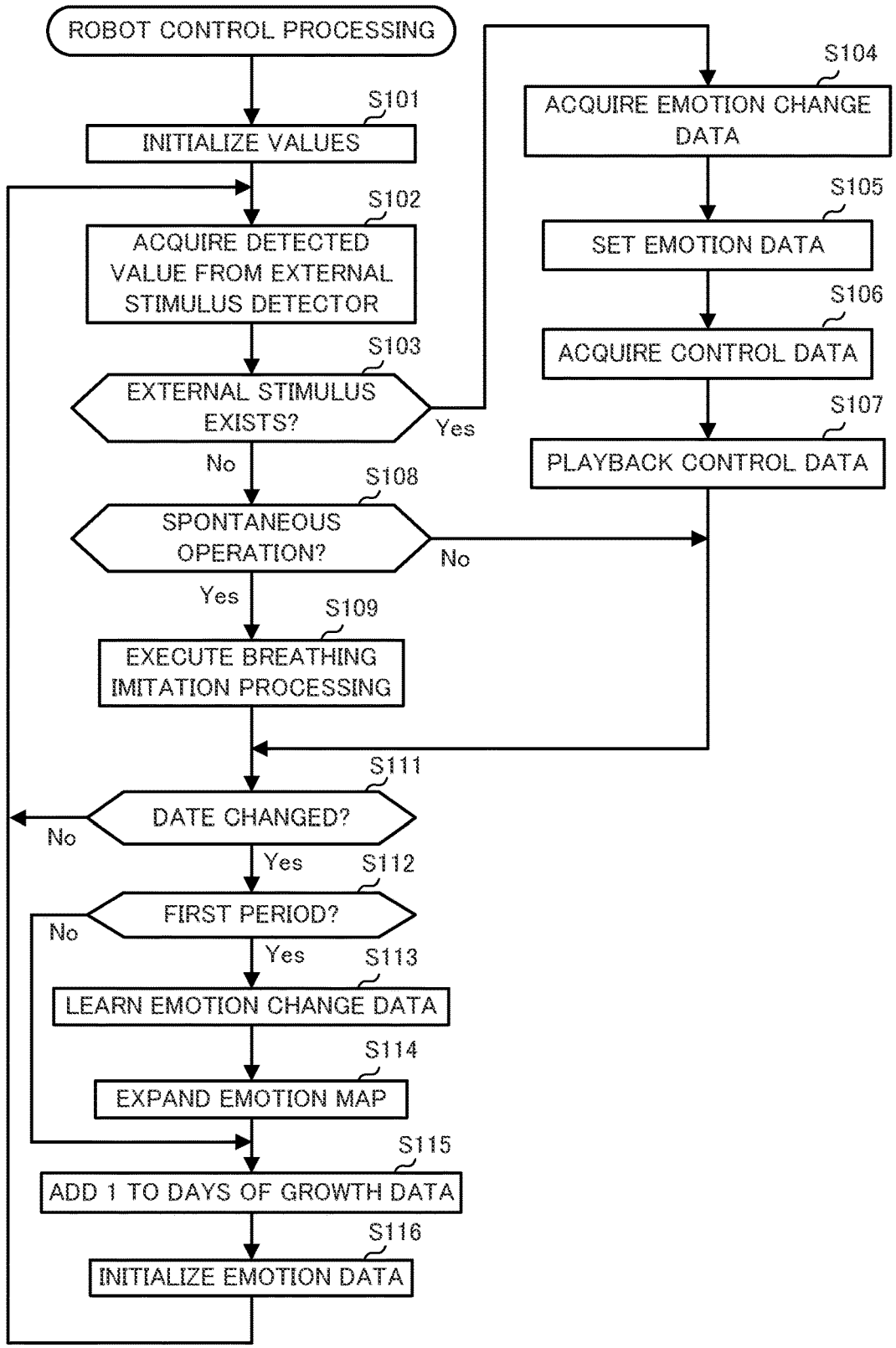
FIG. 7 is a flowchart illustrating a flow of robot control processing of the robot according to Embodiment 1.

Although omitted in FIG. 7, in step S109, the control content of the spontaneous operation may be changed based on the emotion data, as in a case where an external stimulus is present.

In step S11, the controller 110 determines whether or not the date has changed by the clock function. If the date has not changed (step S111; No), the controller 110 returns to step S102.

If the date has changed (step S111; Yes), the controller 110 determines whether or not it is in the first period (step S112). Assuming the first period is, for example, a period of 50 days from the simulated birth of the robot 200 (for example, at the time of initial activation by a user after purchase), if the days of growth data 123 is 50 or less, the controller 110 determines that it is in the first period. If it is not in the first period (step S112: No), the controller 110 proceeds to step S115.

When it is in the first period (step S112; Yes), the controller 110 learns emotion change data 122 (step S113). Learning of the emotion change data 122 is processing for updating the emotion change data 122, specifically, in step S105 of the day, by adding 1 to the DXP of the emotion change data 122 if the X value of the emotion data 121 has been set to the maximum value of the emotion map 300 even once, adding 1 to the DYP of the emotion change data 122 if the Y value of the emotion data 121 has been set to the maximum value of the emotion map 300 even once, adding 1 to the DXM of the emotion change data 122 if the X value of the emotion data 121 has been set to the minimum value of the emotion map 300 even once, and adding 1 to the DYM of the emotion change data 122 if the Y value of the emotion data 121 has been set to the minimum value of the emotion map 300 even once.

However, if each value of the emotion change data 122 becomes excessively large, a single change amount of the emotion data 121 becomes excessively large, and thus each value of the emotion change data 122 is limited to a maximum value of, for example, 20 or less. Here, although all of the emotion change data 122 are added by 1, the added value is not limited to 1. For example, the number of times that each value of the emotion data 121 has been set to the maximum or minimum value of the emotion map 300 may be counted, and if the number of times is high, the numerical value to be added to the emotion change data 122 may be increased.

Returning to FIG. 7, the controller 110 then expands the emotion map 300 (step S114). Expansion of the emotion map is specifically processing in which the controller 110 expands each of the maximum value and the minimum value of the emotion map 300 by 2. However, this expanding numerical value "2" is only an example, and may be expanded by 3 or more, or may be expanded only by 1. Also, the expanding numerical value may differ for each axis of the emotion map 300 or between the maximum value and the minimum value.

Although, in FIG. 7, the learning of the emotion change data 122 and the expansion of the emotion map 300 are assumed to be performed after the controller 110 determines that the date has changed in step S111 the learning of the emotion change data 122 and the expansion of the emotion map 300 may be performed after the controller 110 determines that it has reached a reference time (for example, 9 p.m.). Alternatively, the determination in step S11 may not be based on the actual date, but may be based on the value that the timer function of the controller 110 has accumulated the power-on time of the robot 200. For example, each time the power-on cumulative time becomes a multiple of 24, the robot 200 may be considered to have grown one more day, then, learning of the emotion change data 122 and expansion of the emotion map 300 are performed.

Returning to FIG. 7, the controller 110 adds 1 to the days of growth data 123 (step S115), initializes both X and Y values of the emotion data to 0 (step S116), and returns to step S102. Note that in a case in which it is better for the robot 200 to carry over the simulated emotion of the previous day to the next day, the controller 110 returns to step S102 without performing the processing of step S116.

Figure 8:
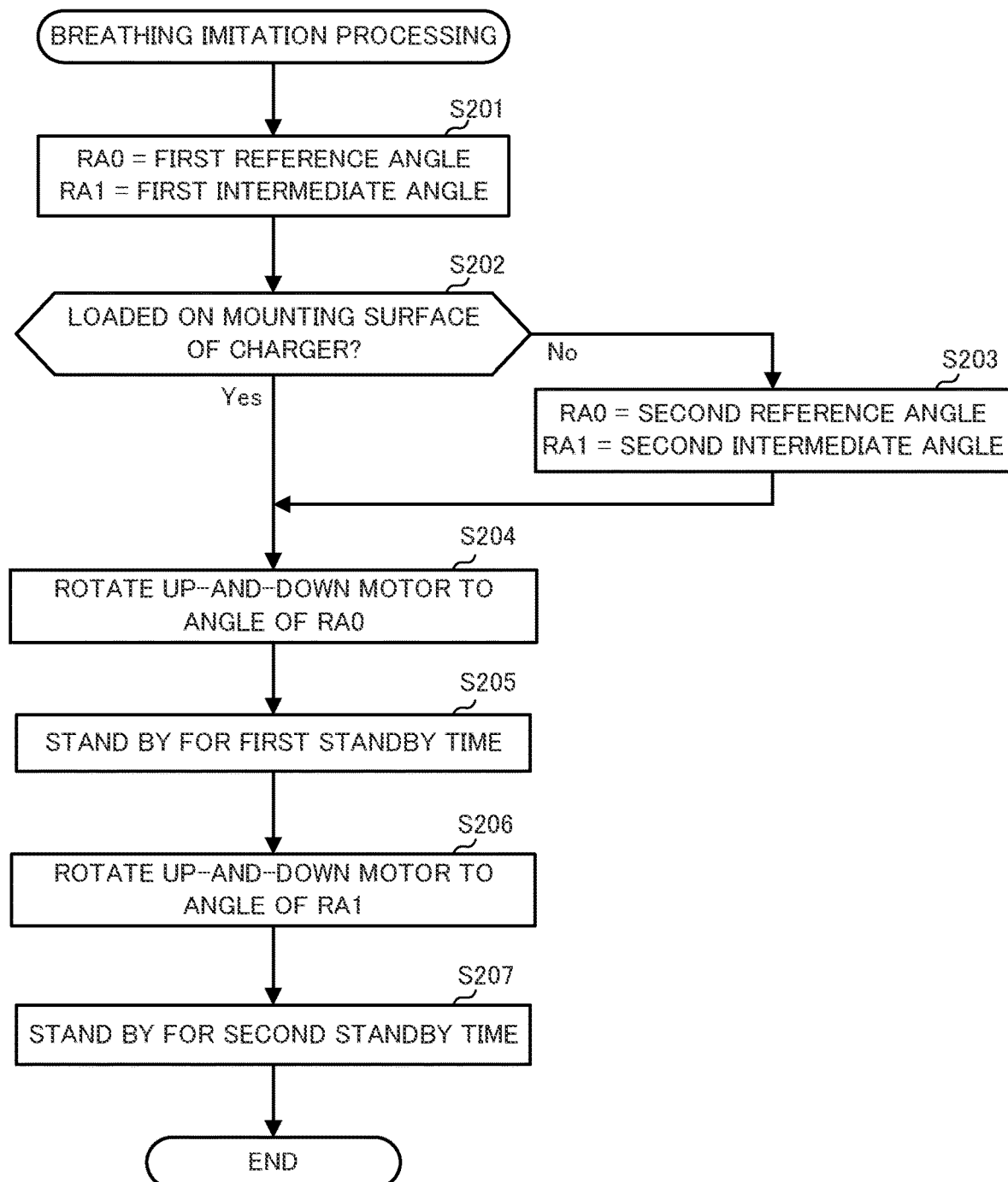
FIG. 8 is a flowchart illustrating a flow of breathing imitation processing of the robot according to Embodiment 1.

The following describes the breathing imitation processing performed in step S109 of the robot control processing described above with reference to FIG. 8. Note that the breathing imitation processing use variables that store two angles (a first angle (a reference angle) and an angle that turns over the movement (an intermediate angle)) that define a range of rotating the up-and-down motor 222 during a breathing operation: a variable RA0 that stores a reference angle and a variable RA1 that stores an intermediate angle. When performing a breathing operation, the controller 110 alternates between processing of rotating the up-and-down motor 222 to the reference angle and processing of rotating the up-and-down motor 222 to the intermediate angle, periodically at a predetermined cycle (for example, a breathing cycle).

First, the controller 110 sets the variable RA0 to a first reference angle (for example, 0 degrees) and the variable RA1 to a first intermediate angle (for example, 10 degrees (upward direction)), respectively (step S201). Note that the first reference angle is a central angle at which the head 204 does not rotate up or down, and is therefore also referred to as a central reference angle. The first intermediate angle is an angle at which the head 204 rotates upward, and is also referred to as an upper reference angle.

The controller 110 then determines whether or not the robot 200 is loaded on the power supply mounting surface of the wireless charger (step S202). Note that the controller 110 can determine whether or not the robot 200 is loaded on the power supply mounting surface of the wireless charger by determining whether or not the power receiver 251 is being able to receive power from the wireless charger.

Note that, with regard to the determination of whether or not the robot 200 is loaded on the power supply mounting surface of the wireless charger, in a case in which a pressure sensor, a capacitance sensor, or the like is provided in the lower portion of the housing 207, the robot 200 can also be determined to be loaded on the power supply mounting surface of the wireless charger when the pressure sensor, capacitance sensor, or the like detects a contact or proximity between the housing 207 and the mounting surface.

The power controller 250 starts charging the battery 252 when the robot 200 is loaded on the power supply mounting surface of the wireless charger, and ends charging when the battery 252 is fully charged. However, even after charging ends, the robot 200 can receive power transmitted from the wireless charger by the power receiver 251 while the robot 200 is loaded on the power supply mounting surface of the wireless charger, so the robot 200 can operate with almost no depletion of the battery 252, and the battery 252 can be charged as soon as it is depleted.

When the robot 200 is not loaded on the power supply mounting surface of the wireless charger (step S202; No), the controller 110 sets the variable RA0 to a second reference angle (for example, −10 degrees (downward direction)) and the variable RA1 to a second intermediate angle (for example, 0 degrees), respectively (step S203), and proceeds to step S204. Note that the second reference angle is also referred to as a lower reference angle at which the head 204 pushes the mounting surface 101 so that the front end of the body 206 is raised by a first distance from the mounting surface 101 and the head 204 is rotated in a downward direction. The second intermediate angle is also referred to as a central reference angle at which the front end of the body 206 is not raised from the mounting surface 101, the distance between the front end of the body 206 and the mounting surface 101 is returned to a second distance that is shorter than the first distance, and the head 204 is not rotated upward or downward direction.

When the robot 200 is loaded on the power supply mounting surface of the wireless charger (step S202; Yes), the process proceeds to step S204.

In step S204, the controller 110 rotates the up-and-down motor 222 to rotate the head 204 to an angle that is set in the variable RA0 (the reference position of the breathing operation).

Next, the controller 110 stands by for a first standby time (for example, 700 milliseconds) using the timer function (step S205). Note that when the controller 110 has a sleep function, the power consumption of the robot 200 may be reduced by setting, before entering the sleep mode, the robot 200 to wake up in the first standby time.

Then, the controller 110 rotates the up-and-down motor 222 to rotate the head 204 to an angle that is set in the variable RA1 (the intermediate position of the breathing operation) (step S206).

Next, the controller 110 stands by for a second standby time (for example, 700 milliseconds) using the timer function (step S207), and ends the breathing imitation processing. Note that when the controller 110 has a sleep function, the power consumption of the robot 200 may be reduced by setting, before entering the sleep mode in step S207, the robot 200 to wake up in the second standby time.

Although the reference angle and the intermediate angle can be set to arbitrary angles, the angles of 0 or larger degrees (the up-and-down reference angle) are preferably included between the reference angle and the intermediate angle. Setting the angles in this way ensures a time period where the entire bottom surface of the body 206 is in contact with the mounting surface 101 (this contact also includes indirect contact via the exterior 201) during a breathing operation. When the robot 200 is loaded on the power supply mounting surface 102 of the wireless charger, and the rotation angle of the head 204 is 0 or larger degrees, the power controller 250 can detect the wireless charger and start charging the battery 252.

With such breathing imitation processing, the robot 200 performs different breathing operations when loaded on the wireless charger and when not loaded on the wireless charger.

Figure 9:
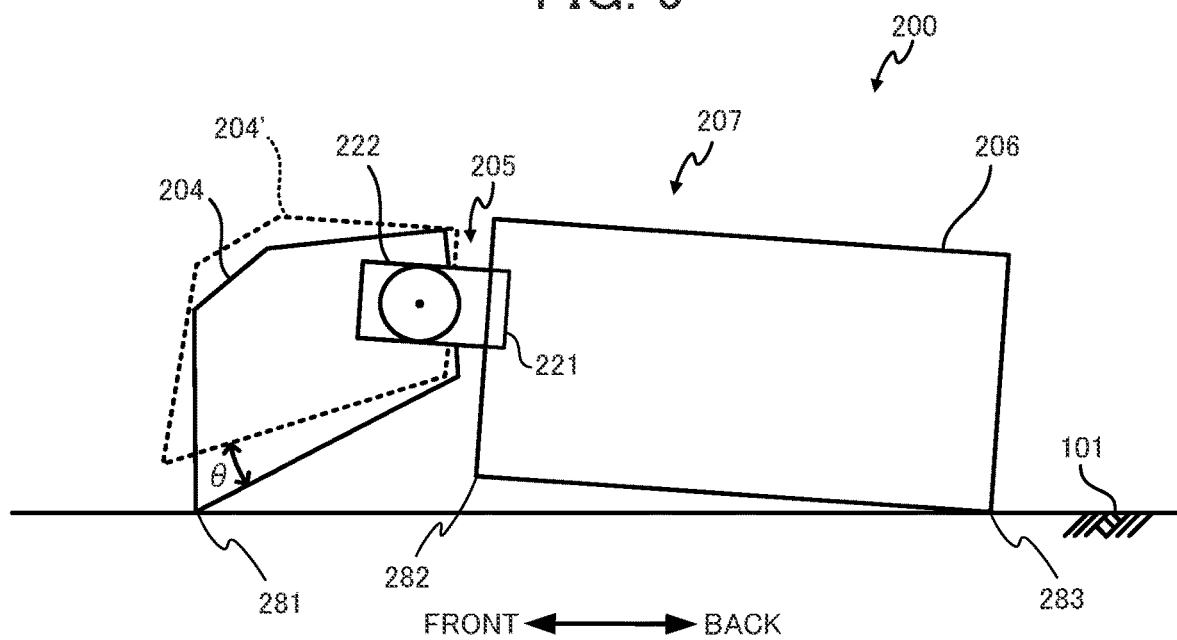
FIG. 9 is a diagram illustrating a non-charging breathing operation of the robot according to Embodiment 1.

For example, when the robot 200 is not loaded on a wireless charger (when the power supply operation for charging the battery 252 is not performed), the robot 200 first rotates the head 204 to the lower reference angle as illustrated in FIG. 9 to raise the front end of the body 206 from the mounting surface 101 (natural breathing can be expressed by setting the raising distance to a distance of about 10% (a first distance) relative to the size in a height direction of the body 206). This operation of the robot 200 is referred to as a first operation. The first operation can be said to be an operation to rotate the head 204 in a direction in which the distance between the front end of the head 204 (front lower portion 281) and the mounting surface 101 is shortened, or can be said to be an operation to rotate the head 204 in a direction in which the distance between the front end of the head 204 (front lower portion 281) and the body 206 is shortened.

Figure 10:
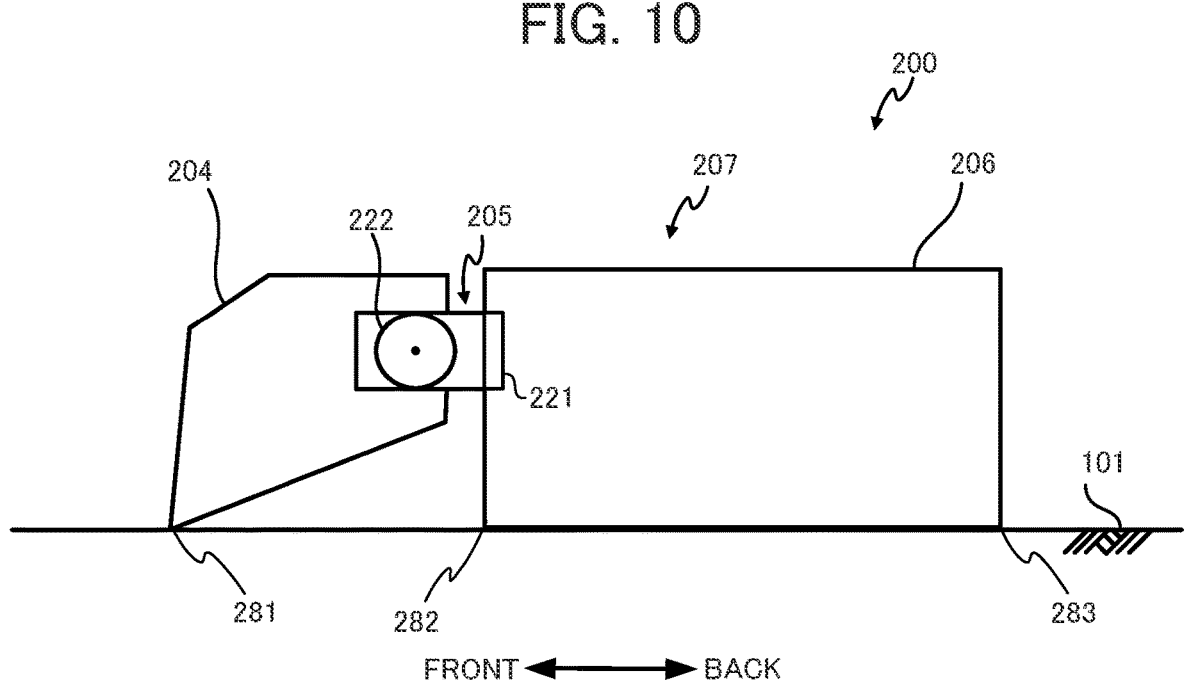
FIG. 10 is another diagram illustrating a non-charging breathing operation of the robot according to Embodiment 1.

Subsequently, as illustrated in FIG. 10, the head 204 is rotated to the intermediate reference angle so that the bottom surface of the body 206 contacts the mounting surface 101 via the exterior 201 (the distance between the bottom surface of the body 206 and the mounting surface 101 via the exterior 201 is, for example, about 5 mm (the second distance shorter than the first distance), and the body 206 still can receive power from the wireless charger). This operation of the robot 200 is referred to as a second operation. The second operation can be said to be an operation to rotate the head 204 in a direction in which the distance between the front end of the head 204 and the mounting surface 101 becomes longer, or can be said to be an operation to rotate the head 204 in a direction in which the distance between the front end of the head 204 (front lower portion 281) and the body 206 becomes longer. By performing the second operation, the bottom surface of the body 206 becomes parallel to the mounting surface 101.

When the first operation is performed, the upper side of the exterior 201 is in a state in which the upper side of the exterior 201 is pulled by the first engaged portion moving to a position above the connection position (the second rotational axis of the joint 205) and lower than the upper surface of the head 204, and the distance of the exterior 201 from the first engaged portion to the second engaged portion through the upper surface of the head 204 being longer than the distance derived from the second operation.

The controller 110 of the robot 200 then controls the movement of the movable portion 220 to alternate repeatedly between the first and second operations periodically at a predetermined cycle (for example, a breathing cycle). This control is referred to as a first control. The first control can also be said to be a control for controlling the movable portion 220 to move the head 204 so that the state of the head 204 pushing the mounting surface 101 changes and the distance between the front end of the body 206 and the mounting surface 101 alternates between the first distance and the second distance.

Figure 12:
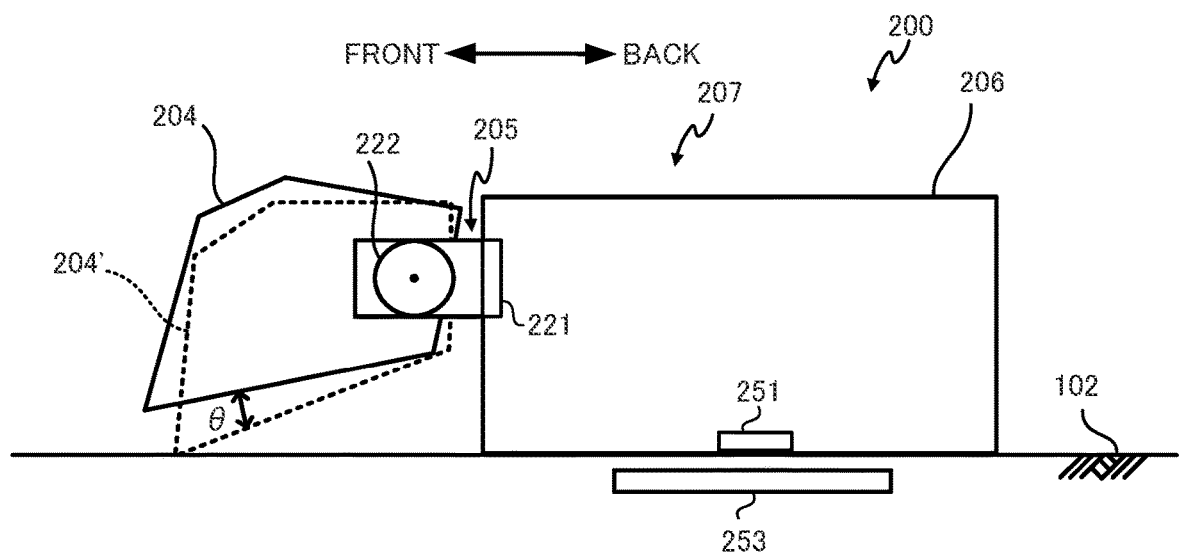
FIG. 12 is another diagram illustrating a charging breathing operation of the robot according to Embodiment 1.

Note that, in FIG. 9 and FIG. 12 described later, the dashed line indicates the position of the head 204' when the rotation angle of the up-and-down motor 222 is 0 degrees, and θ is an angle of the difference between RA0 and RA1 (for example, 10 degrees).

By the controller 110 performing the first control, the robot 200 performs a breathing operation that is an operation that imitates the breathing of a living thing. Since the controller 110 performs the first control when the battery 252 is not being charged, the breathing operation performed by the robot 200 when the controller 110 is performing the first control is referred to as a non-charging breathing operation. In the non-charging breathing operation, the controller 110 controls the movable portion 220 so that the distance between the power receiver 251 and the power supply mounting surface 102 changes. In other words, the controller 110 moves the head 204 so that the distance between the front end of the body 206 and the mounting surface 101 changes. Note that the first control is also referred to as a proximity-unmaintained control since the first control includes a first operation in which the front end of the body 206 is raised from the mounting surface 101, and proximity to the mounting surface 101 is not maintained.

Figure 11:
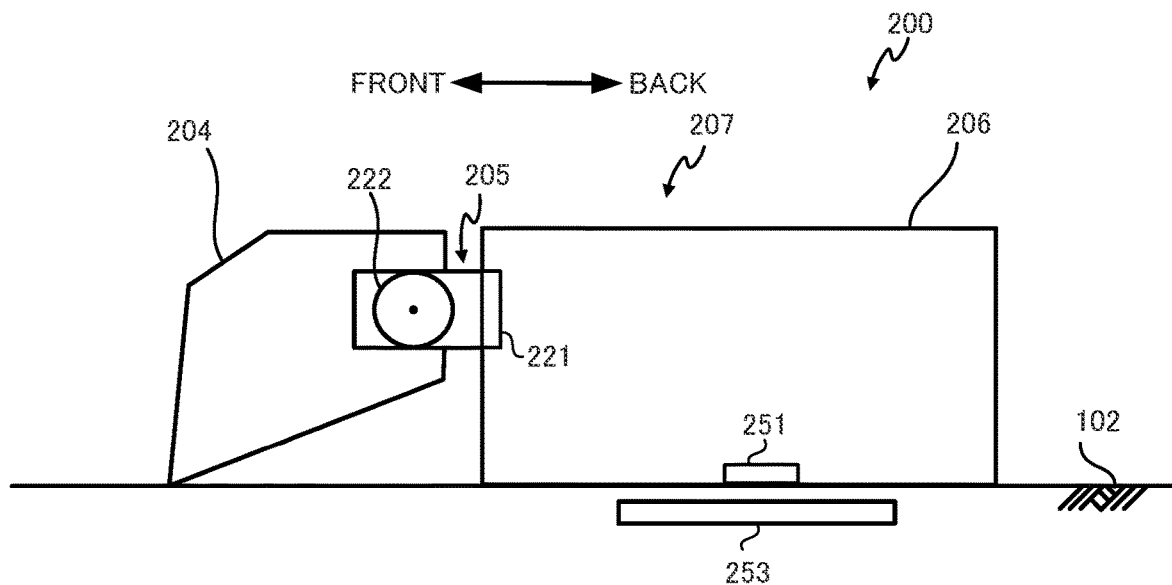
FIG. 11 is a diagram illustrating a charging breathing operation of the robot according to Embodiment 1.

Also, when the robot 200 is loaded on the power supply mounting surface 102 of the wireless charger (when a power supply operation for charging the battery 252 is being performed), the robot 200 rotates the head 204 to the central reference angle as illustrated in FIG. 11 so that the bottom surface of the body 206 comes into contact with the power supply mounting surface 102 of the wireless charger. This operation of the robot 200 is referred to as a third operation. The head 204 is then rotated to the upper reference angle as illustrated in FIG. 12 to face upwards while the bottom surface of the body 206 is in contact with the power supply mounting surface 102. This operation of the robot 200 is referred to as a fourth operation. The controller 110 of the robot 200 then controls the movement of the movable portion 220 to alternate between the third and fourth operations periodically at a predetermined cycle (for example, a breathing cycle). This control is referred to as a second control.

When the fourth operation is performed, the upper side of the exterior 201 is in a state in which the upper side of the exterior 201 is further slacked by the first engaged portion moving to a position higher than the position derived from the third operation, and the distance of the exterior 201 from the first engaged portion to the second engaged portion through the upper surface of the head 204 being shorter than the distance derived from the third operation.

Even the controller 110 performs the second control, the robot 200 performs a breathing operation that is an operation that imitates the breathing of a living thing. Since the controller 110 performs the second control when the battery 252 is being charged, the breathing operation performed by the robot 200 when the controller 110 is performing the second control is referred to as a charging breathing operation. In the charging breathing operation, the controller 110 controls the movable portion 220 to maintain the power receiver 251 in close proximity to the power supply mounting surface 102. In other words, the controller 110 moves the head 204 so that the distance between the front end of the body 206 and the mounting surface 101 does not change. Note that the second control is also referred to as a proximity maintained control since the bottom surface of the body 206 is kept in close proximity to the mounting surface 101.

By performing a breathing operation that imitates the breathing of a living thing in such a manner, while the robot 200 is not being charged (when the robot 200 is not loaded on the wireless charger), when the controller 110 performs the first operation (at the reference position (FIG. 9)), the front end of the body 206 is raised from the mounting surface 101 with the back end of the body 206 remained close to the mounting surface 101 and, when the controller 110 performs the second operation (at the intermediate position (FIG. 10)), the front end of the body 206 returns from a raised state to a not raised state with reference to the mounting surface 101. In other words, in a non-charging breathing operation, since the central portion of the robot 200 moves up and down at a predetermined cycle, the fur-covered robot 200 can appear to be breathing naturally. Also, since the body 206 itself moves up and down, the breathing motion of a living thing can be imitated stably without being affected by the attachment state of the exterior 201 or the like.

Thus, in a non-charging breathing operation, the breathing motion of a living thing can be imitated separately from a change in the tension state on the upper side of the exterior 201, however, the breathing motion of a living thing is also imitated by a change in the tension state on the upper side of the exterior 201 as follows.

When the controller 110 performs the first operation (at the reference position (FIG. 9)), the central portion of the exterior 201 is in a state in which the central portion of the exterior 201 is flat by the upper side of the exterior 201 being pulled, and when the controller 110 performs the second operation (at the intermediate position (FIG. 10)), the central portion of the exterior 201 is in a state in which the central portion of the exterior 201 is inflated to the upper side of the exterior 201 by the upper side being slacked. In this way, the breathing operation changes both the height of the front end of the body 206 and the pulling state of the exterior 201 periodically at a predetermined cycle, making the breathing of the robot 200 more apparent.

While the robot 200 is being charged (when the robot 200 is loaded on the wireless charger), the breathing of the robot 200 is apparent since the upper side of the exterior 201 is in a state in which the upper side of the exterior 201 is more slacked when the controller 110 performs the fourth operation (at the intermediate position (FIG. 12)) than when the controller 110 performs the third operation (at the reference position (FIG. 11)). Then, as can be seen from FIG. 11 (the reference position) and FIG. 12 (the intermediate position), during these operations, the entire bottom surface of the body 206 is constantly in contact with the power supply mounting surface 102 (the contact includes an indirect contact via the exterior 201), so that the transmitting antenna 253 for power supply of the wireless charger and the power receiver 251 of the robot 200 are constantly in close proximity during a breathing operation, thereby enabling stable charging.

In this manner, the controller 110 performs processing that differentiates the control contents of the movable portion 220 during breathing operations between a breathing operation while the battery 252 is being charged (a charging breathing operation) and a breathing operation while the battery 252 is not being charged (a non-charging breathing operation), whereby the robot 200 can receive a stable power supply from the wireless charger during charging, as well as, the sense of a living thing can be better expressed with the exterior pulled more apparently during non-charging. Although, in the above description, the control content of the breathing operation is mainly described as the control content of the movable portion 220, the control content may include a control content that controls the sound outputter 230 (that is, the control content of the operator) instead of or in addition to the movable portion 220.

As described above, in steps S205 and S207, the controller 110 may reduce the power consumption of the robot 200 by entering the sleep mode. In the sleep mode, the power consumption of each motor can also be reduced by setting each motor equipped in the movable portion 220 to a free state. However, in this case, when the up-and-down motor 222 is set to a free state, the up-and-down motor 222 is affected by a force that brings the rotation angle of the up-and-down motor 222 closer to 0 (gravity). To mitigate this effect, the difference between the reference angle and the intermediate angle is preferably made less than 10 degrees.

Also, the first standby time and the second standby time need not be fixed values. For example, when the robot 200 receives an external stimulus, such as being petted, spoken to, surprised, flipped, or the like, the breathing cycle may be shortened at the time of determination in step S108 of the robot control processing (FIG. 7) and the first standby time and the second standby time may be reduced, and then the breathing processing may gradually return to normal. In this way, it is possible to imitate the way that breathing becomes faster when the simulated emotion of the robot 200 is stirred and then gradually calms down.

In addition, in the above-described breathing imitation processing (FIG. 8), not only the first standby time and the second standby time may be changed, but also the control content of the movable portion 220 may be changed in accordance with the emotion data 121 and the emotion change data 122. For example, when the simulated emotion of the robot 200 tends to be peaceful, the head 204 may be moved slowly up and down, and when the simulated emotion of the robot 200 tends to be upset, the head 204 may be moved left and right, as well as, up and down. The difference in the up-and-down rotation angle and the left-and-right rotation angle between the reference position and the intermediate position may be increased in accordance with the magnitude of each value of the emotion data 121.

Embodiment 2

When the robot 200 is loaded on the power supply mounting surface 102 of the wireless charger, the battery 252 is charged by the power controller 250. The remaining battery level can then be displayed on the wireless charger, a smartphone that is connected via the communicator 130, and/or the like. The robot 200 may also be equipped with an indicator, such as a light emitting diode (LED), to indicate the remaining battery level. However, in order to express the sense of a living thing, the remaining battery level can be desirably expressed by the movement of the robot 200. Accordingly, Embodiment 2 is described in which the robot 200 performs an operation (a gesture) in accordance with the remaining battery level when the robot 200 is removed from the power supply mounting surface 102 of the wireless charger.

The functional configuration and structure of the robot 200 according to Embodiment 2 are similar to those of Embodiment 1, and thus descriptions thereof are omitted.

When the robot 200 is loaded on the power supply mounting surface 102 of the wireless charger, the battery 252 of the robot 200 is in a powered state (the state of being charged by receiving power supply from the wireless charger). More specifically, when the robot 200 is loaded on the power supply mounting surface 102, an induced magnetic flux occurs between the receiving antenna of the power receiver 251 provided on the bottom surface of the body 206 and the transmitting antenna provided on the power supply mounting surface 102 of the wireless charger, and the power controller 250 detects this induced magnetic flux and starts charging the battery 252.

Also, when the robot 200 moves away from the power supply mounting surface 102, the battery 252 of the robot 200 is in a non-powered state (a state of not being charged with no power supply received from the wireless charger). More specifically, when the robot 200 moves away from the power supply mounting surface 102, the induced magnetic flux that was generated between the receiving antenna of the power receiver 251 and the transmitting antenna of the wireless charger disappears, and the power supply operation stops. The power controller 250 detects the loss of this induced magnetic flux and terminates charging the battery 252. Note that when the robot 200 includes a pressure sensor, a capacitance sensor, or the like in the lower portion of the housing 207, the pressure sensor, the capacitance sensor, or the like may detect that the robot 200 has moved away from the power supply mounting surface 102 and terminate charging. As described above, although the power supply operation stops when the robot 200 is removed from the charger by a user operation, the power supply operation also stops when the battery 252 is fully charged, regardless of a user operation.

Figure 13:
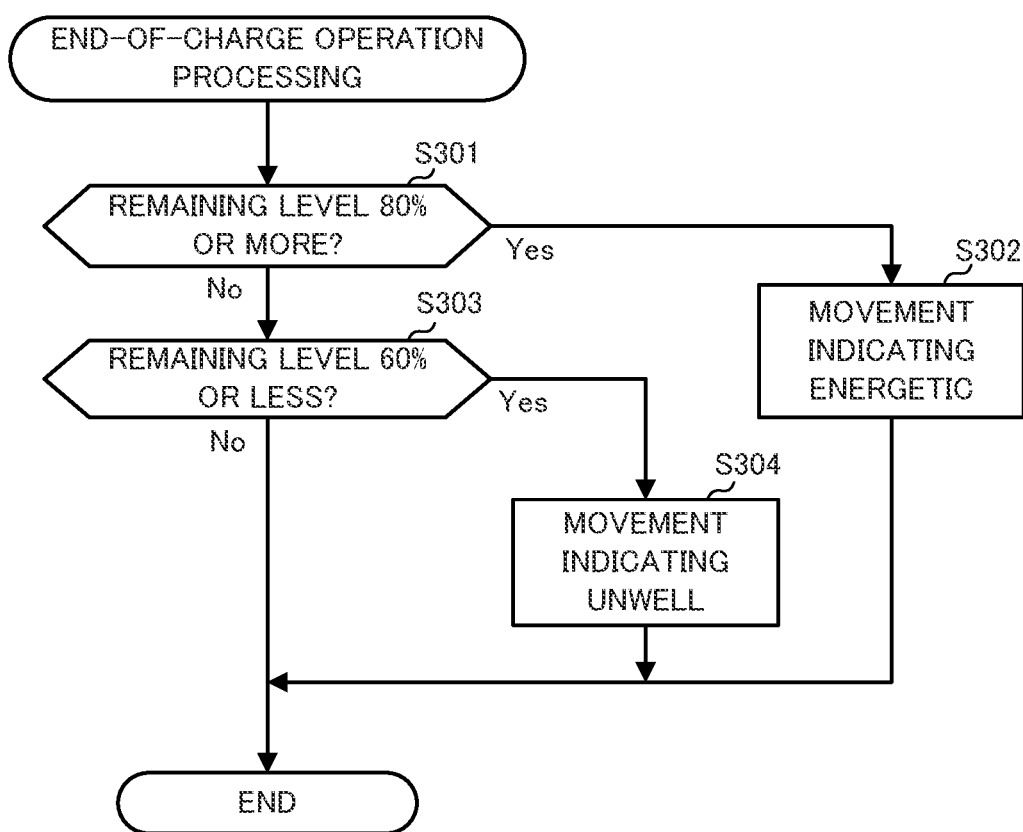
FIG. 13 is a flowchart illustrating a flow of end-of-charge operation processing of the robot according to Embodiment 2.

Once the power controller 250 has terminated charging the battery 252, the controller 110 starts executing the end-of-charge operation processing. This end-of-charge operation processing is described with reference to FIG. 13. However, the timing at which the controller 110 starts executing the end-of-charge operation processing is not limited to the point of time at which the robot 200 moves away from the power supply mounting surface 102, but may also be the point of time at which the power supply operation stops.

First, the controller 110 determines whether or not the remaining level of the battery 252 is equal to or greater than a first threshold (for example, 80%) (step S301). If the remaining level of the battery 252 is equal to or greater than the first threshold (step S301; Yes), the controller 110 controls the movable portion 220 and the sound outputter 230 to perform an operation (a first imitation operation) that imitates the movement of an energized living thing as a first post-charging operation (step S302), and ends the end-of-charge operation processing.

The operation that imitates the movement of an energized living thing is, for example, an operation that outputs an energetic sound from the sound outputter 230 and performs grooming (controlling the movable portion 220 to obliquely angle the head 204 downward and move the head 204 slightly up and down). Note that the first imitation operation is not limited to an operation that imitates the movement of an energized living thing. For example, the first imitation operation may be an operation that imitates the movement of a living thing such as "a movement indicating being satisfied," "a movement indicating being happy to go out and looking around," "a movement indicating being happy to go out and dancing," and "a movement indicating being satisfied and grooming."

On the other hand, when the remaining level of the battery 252 is less than the first threshold (step S301; No), the controller 110 determines whether or not the remaining level of the battery 252 is equal to or less than a second threshold (for example, 60%) (step S303).

If the remaining level of the battery 252 is equal to or less than the second threshold (step S303; Yes), the controller 110 controls the movable portion 220 and the sound outputter 230 to perform an operation (a second imitation operation) that imitates the movement of an unwell living thing as a second post-charging operation (step S304), and ends the end-of-charge operation processing. The operation that imitates the movement of an unwell living thing is an operation that, for example, outputs a sound indicating annoyance from the sound outputter 230 and performs an annoyed gesture (controlling the movable portion 220 to shake the head 204 left and right). Note that the second imitation operation is not limited to an operation that imitates the movement of an unwell living thing. For example, the second imitation operation may be an operation that imitates the movement of a living thing such as "a movement indicating not being satisfied," "a movement indicating annoyance by shaking the head," and "a movement of crying sadly."

On the other hand, if the remaining level of the battery 252 exceeds the second threshold (step S303; No), the controller 110 ends the end-of-charge operation processing without doing anything.

The end-of-charge operation processing described above causes the robot 200 to operate in accordance with the charged status (remaining level) of the battery 252 at the time when a user lifts the robot 200 from the power supply mounting surface 102 of the wireless charger. In this manner, the controller 110 changes the control content of the operator in accordance with the remaining level of the battery 252 at the time when the robot 200 changes from a powered state to a non-powered state so that the robot 200 can notify a user of the remaining level of the battery 252 while expressing the sense of a living thing.

For example, when the robot 200 changes from a powered state to a non-powered state, if the remaining level of the battery 252 is equal to or greater than the first threshold (for example, 80%), the robot 200 performs the first post-charging operation (an operation that imitates the movement of an energized living thing), and if the remaining level of the battery 252 is equal to or less than the second threshold (for example, 60%), the robot 200 performs the second post-charging operation (an operation that imitates the movement of an unwell living thing), so that the robot 200 can notify a user of the remaining level of the battery 252 while expressing the sense of a living thing.

In the above-described end-of-charge operation processing (FIG. 13), if the remaining level of the battery 252 exceeds the second threshold and is less than the first threshold, the robot 200 performs a normal non-charging breathing operation without performing special operations. However, as an operation in this case, the controller 110 may control the movable portion 220 and the sound outputter 230, for example, to perform an operation indicating relatively fine (a third post-charging operation). The operation indicating relatively fine is, for example, an operation of outputting a quiet sound from the sound outputter 230 and nodding (controlling the movable portion 220 to set both the left-and-right and the up-and-down rotation angles of the head 204 to 0 degrees and then slightly up and down the head 204).

Also, these post-charging operations (first post-charging operation, second post-charging operation, third post-charging operation) need not be limited to two or three. The thresholds may be divided more finely to define four or more post-charging operations, and the controller 110 may control the movable portion 220 and the sound outputter 230 to perform any of the post-charging operations, in accordance with the remaining level of the battery 252.

Also, in each of the post-charging operations described above, the controller 110 may set (for example, change) the emotion data 121 in accordance with the remaining level of the battery 252, as well as, perform a different post-charging operation in accordance with the changed emotion data 121. In this case, for example, the lower the remaining level of the battery 252, the greater the degree of worry and disinterest may be, and the greater the remaining level of the battery 252, the greater the degree of relaxation and excitement may be. The end-of-charge operation may also be more emotionally emphasized than the usual emotionally responsive operation.

Each of the above-described post-charging operations need not be a fixed operation, and the controller 110 may change the control content of the movable portion 220 and the sound outputter 230 in accordance with the emotion data 121 and the emotion change data 122. For example, in an energetic sound or movement as a first post-charging operation, the controller 110 may make a quiet sound or movement when the simulated emotion of the robot 200 tends to be disinterested, and the controller 110 may make an excited sound or movement when the simulated emotion of the robot 200 tends to be excited. The controller 110 may also speed up the operation cycle or increase the amount of movement when the simulated emotion of the robot 200 tends to be excited. Also, when the robot 200 tends to be happy, the head may be moved upward.

Similarly, in a sound or movement indicating annoyance as a second post-charging operation, the controller 110 may make a sad sound or movement when the simulated emotion of the robot 200 tends to be sad (for example, a slower pitch or volume change at a lower pitch), and the controller 110 may make a upset sound or movement when the simulated emotion of the robot 200 tends to be upset (for example, a faster pitch or volume change at a higher pitch). The controller 110 may also move the head downward when the simulated emotion of the robot 200 tends to be sad.

In addition, the processing content of the breathing imitation processing (FIG. 8) may be changed according to the remaining level of the battery 252 not only when the powered state changes to the non-powered state, but also during charging. For example, when the remaining level is low (for example, less than 30%), the first intermediate angle may be increased (for example, 25 degrees), and when the remaining level increases, the first intermediate angle may be decreased accordingly (for example, 20 degrees if the remaining level is less than 60% and equal to or more than 30%, 15 degrees if the remaining level is less than 80% and equal to or less than 60%, 10 degrees if the remaining level is greater than or equal to 80%).

Although, in the above-described breathing operation, the left-and-right rotation angle of the head 204 is set to 0 degrees, the controller 110 does not necessarily have to set the left-and-right rotation angle of the head 204 to 0 degrees in the breathing operation.

In the charging breathing operation, as long as the entire bottom surface of the body 206 constantly remains in contact with the power supply mounting surface 102, the left-and-right rotation angle can be freely set within the range. For example, if the up-and-down rotation angle of the head 204 is set to a specific angle (for example, 20 degrees) or larger, the left-and-right rotation angle can be freely set in this case because the head 204 will not hit the power supply mounting surface 102 even when the head 204 is twisted left or right. The controller 110 may then change the left-and-right rotation angle of the head 204 in accordance with the remaining level of the battery 252.

Further, in the non-charging breathing operation, the left-and-right rotation angle is arbitrary. However, a time period is preferably ensured where the entire bottom surface of the body 206 is in contact with the mounting surface 101 between the reference position and the intermediate position in the breathing operation. Since the transmitting antenna 253 of the wireless charger and the power receiver 251 of the robot 200 are in close proximity during this time period, an induced magnetic flux occurs between the receiving antenna of the power receiver 251 and the transmitting antenna 253 of the wireless charger, and the power controller 250 can detect this induced magnetic flux and start charging the battery 252.

Variations

Note that the present disclosure is not limited to the above-described embodiments, and various variations and applications are possible. For example, Embodiment 1 and Embodiment 2 may be combined. In such a case, during charging, the robot 200 performs a breathing operation to raise and lower the head 204 with the entire bottom surface of the body 206 in contact with the power supply mounting surface 102, and, when a user lifts the robot 200 from the power supply mounting surface 102 and terminates the charging, the robot 200 performs an operation in accordance with the remaining battery level at that time. During non-charging, the robot 200 performs a breathing operation to raise the joint 205 (or the back end of the head 204 and the front end of the body 206).

Although, in the above-described embodiments, the configuration is such that the control device 100 of the apparatus is embedded in the robot 200, the control device 100 of the apparatus may not be embedded in the robot 200. For example, the control device 100 of the apparatus according to a variation may be configured as a separate device (for example, a server) without being embedded in the robot 200. In this variation, the robot 200 also includes a communicator 260 and is configured so that the communicator 130 and the communicator 260 can transmit and receive data to and from each other. Then, the controller 110 acquires an external stimulus detected by the external stimulus detector 210 through the communicator 130 and the communicator 260 and controls the movable portion 220 and the sound outputter 230 through the communicator 130 and the communicator 260.

Also, in the embodiments described above, the control device 100 of the apparatus is a control device that controls the robot 200, but the apparatus subject to control is not limited to the robot 200. The apparatus subject to control can also be considered, for example, a watch or the like. For example, when the apparatus subject to control is a watch capable of outputting sounds and equipped with an acceleration sensor and a gyro sensor, an external stimulus can be assumed to be an impact applied to the watch that is detected by the acceleration sensor, the gyro sensor, or the like. Then, conceivably, the emotion change data 122 and the emotion data 121 are updated in accordance with the external stimulus, and the sound effect data set in the control content table 124 are adjusted (changed) and output based on the emotion data 121 when the watch is put on by a user.

In this way, if the watch has been handled violently, the watch can emit a sad sound effect when a user is putting on the watch, and if the watch has been handled carefully, the watch can emit a happy sound when the user is putting on the watch. Furthermore, if the emotion change data 122 is set in the first period (for example, 50 days), the watch will have a character (a simulated character) depending on how the user handles it in the first period. In other words, even if the watch is of the same model number, if the user handles it carefully, the watch becomes a watch that is easy to feel happy, and if it is handled violently, the watch becomes a watch that is easy to feel sad.

In this manner, the control device 100 of the apparatus is not limited to a robot, but can be applied to various apparatus, and the applied apparatus can be provided with a simulated emotion and character. Furthermore, the control device 100 of the apparatus can be applied to various apparatus to make a user feel that the user is simulatedly growing the apparatus.

In the above-described embodiments, the operation program executed by the CPU of the controller 110 is described as being stored in the ROM or the like of the storage 120 in advance. However, the present disclosure is not limited thereto, and the operating program for executing the above-described various types of processing may be implemented in an existing general-purpose computer or the like, thereby causing the computer to function as a device equivalent to the control device 100 of the apparatus according to the above-described embodiments.

The method of providing such a program is arbitrary. The program may be, for example, distributed by being stored in a computer-readable recording medium (a flexible disk, a compact disc (CD)-ROM, a digital versatile disc (DVD)-ROM, a magneto-optical disc (MO), a memory card, an USB memory, and/or the like), or may be provided by being stored in a storage on a network such as the Internet and downloaded.

When the above-described processing is executed by sharing the load between the operating system (OS) and the application program or in cooperation between the OS and the application program, only the application program may be stored in a recording medium or a storage. Alternatively, the program may be superimposed on a carrier wave and distributed over a network. For example, the above program may be posted on a bulletin board (Bulletin Board System: BBS) on a network and distributed over the network. Then, the above-described processing can be executed by activating the program and executing the program in a similar manner as other application programs under the control of the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A robot that imitates a living thing and that is driven by a battery that is rechargeable, the robot comprising:
a body;
a head connected to a front end of the body;
an operator which causes the robot to perform an operation that imitates the living thing, the operator comprising a movable portion configured to move the head relative to the body; and
a controller configured to execute processes including controlling the operator to cause the robot to perform a breathing operation that is an operation imitating breathing of the living thing at a predetermined cycle, wherein:
the controller is configured such that a control content of control executed by the operator when causing the robot to perform the breathing operation differs between (i) a charging breathing operation that is the breathing operation performed during charging of the battery and (ii) a non-charging breathing operation that is the breathing operation performed during non-charging of the battery,
in the non-charging breathing operation, the controller controls the movable portion to move the head so that a distance between the front end of the body and a mounting surface changes, and
in the charging breathing operation, the controller controls the movable portion to not move the head such that the distance between the front end of the body and the mounting surface does not change.

2. The robot according to claim 1, further comprising:
a power receiver which receives a power supply to charge the battery within a predetermined proximity to a power supply mounting surface of a charger,
wherein the processes include:
controlling the movable portion so that a distance between the power receiver and the power supply mounting surface changes in the non-charging breathing operation, and
performing a proximity maintained control by controlling the movable portion to maintain a state in which the power receiver is within the predetermined proximity to the power supply mounting surface in the charging breathing operation.

3. The robot according to claim 2, further comprising:
an exterior imitating fur that covers a housing including the head and the body,
wherein the proximity maintained control includes periodically changing a pulling state of the exterior at a predetermined cycle while maintaining the state in which the power receiver is within the predetermined proximity to the power supply mounting surface.

4. The robot according to claim 1, wherein in the non-charging breathing operation, the controller executes a first control that controls the movable portion so that the distance between the front end of the body and the mounting surface alternately changes between a first distance and a second distance by moving the head to change a state in which the head pushes against the mounting surface.

5. The robot according to claim 4, wherein in the non-charging breathing operation, the controller executes the first control in a manner that alternates repeatedly at a predetermined cycle between (i) a first operation of rotating the head to a lower reference angle that is an angle for making a state in which the front end of the body is raised from the mounting surface by the first distance by causing the head to push against the mounting surface and (ii) a second operation of rotating the head to a central reference angle that is an angle for making a state in which the distance between the front end of the body and the mounting surface is returned to the second distance that is shorter than the first distance in a state in which the front end of the body is not raised from the mounting surface.

6. The robot according to claim 1, wherein the processes include setting emotion data indicating a simulated emotion, changing a control content of the movable portion based on the set emotion data, and changing the emotion data in accordance with a remaining level of the battery.

7. The robot according to claim 3, wherein:
the exterior includes a first engaging portion and a second engaging portion, the head includes a first engaged portion securing the first engaging portion to the head, the body includes a second engaged portion securing the second engaging portion to the body, and the exterior is engaged with the housing by engaging the first engaging portion with the first engaged portion and the second engaging portion with the second engaged portion.

8. The robot according to claim 7, wherein:

the exterior includes an exterior protrusion within a first specific range from the first engaging portion, the head includes a head recess within a second specific range from the first engaged portion, and a position of the exterior protrusion is secured to a position of the head recess by inserting the exterior protrusion into the head recess.

9. The robot according to claim 1, further comprising:

an external stimulus detector, wherein the processes include setting, based on an external stimulus detected by the external stimulus detector, emotion data indicating a simulated emotion, and changing the predetermined cycle based on the set emotion data.

10. A robot control method executed by a controller of a robot that is driven by a battery that is rechargeable, the robot including the controller, a body, a head connected to a front end of the body, and an operator which causes the robot to perform an operation simulating a living thing, the operator comprising a movable portion configured to move the head relative to the body, and the method comprising:

controlling the operator to cause the robot to perform a breathing operation that is an operation imitating breathing of the living thing at a predetermined cycle, wherein:

in the controlling, a control content of control executed by the operator when causing the robot to perform the breathing operation differs between (i) a charging breathing operation that is the breathing operation performed during charging of the battery and (ii) a non-charging breathing operation that is the breathing operation performed during non-charging of the battery, in the non-charging breathing operation, the controller controls the movable portion to move the head so that a distance between the front end of the body and a mounting surface changes, and in the charging breathing operation, the controller controls the movable portion to not move the head such that the distance between the front end of the body and the mounting surface does not change.

11. The method of claim 10, wherein:

the robot further includes a power receiver which receives a power supply to charge the battery within a predetermined proximity to a power supply mounting surface of a charger, and the method further comprises:

controlling the movable portion to cause the robot to move to perform the breathing operation;

controlling the movable portion so that a distance between the power receiver and the power supply mounting surface changes in the non-charging breathing operation; and controlling the movable portion to maintain a state in which the power receiver is within the predetermined proximity to the power supply mounting surface in the charging breathing operation.

12. A non-transitory computer-readable recording medium storing a program thereon, the program being executable by a controller of a robot that is driven by a battery that is rechargeable, the robot including the controller, a body, a head connected to a front end of the body, and an operator which causes the robot to perform an operation simulating a living thing, the operator comprising a movable portion configured to move the head relative to the body, and the program controlling the controller to execute processes including:

controlling the operator to cause the robot to perform a breathing operation that is an operation imitating breathing of the living thing at a predetermined cycle, wherein:

in the controlling, a control content of control executed by the operator when causing the robot to perform the breathing operation differs between (i) a charging breathing operation that is the breathing operation performed during charging of the battery and (ii) a non-charging breathing operation that is the breathing operation performed during non-charging of the battery, in the non-charging breathing operation, the controller controls the movable portion to move the head so that a distance between the front end of the body and a mounting surface changes, and in the charging breathing operation, the controller controls the movable portion to not move the head such that the distance between the front end of the body and the mounting surface does not change.

13. The non-transitory computer-readable recording medium according to claim 12, wherein:

the robot further includes a power receiver which receives a power supply to charge the battery within a predetermined proximity to a power supply mounting surface of a charger, and the processes include:

controlling the movable portion to cause the robot to move to perform the breathing operation;

controlling the movable portion so that a distance between the power receiver and the power supply mounting surface changes in the non-charging breathing operation; and controlling the movable portion to maintain a state in which the power receiver is within the predetermined proximity to the power supply mounting surface in the charging breathing operation.

* * * * *